US009004455B2

(12) United States Patent
Falcon

(10) Patent No.: US 9,004,455 B2
(45) Date of Patent: Apr. 14, 2015

(54) APPLIANCE LIFT

(75) Inventor: Barry J. Falcon, Marietta, GA (US)

(73) Assignee: Cabinet Essentials Group, LLC, Atlanta, GA (US)

( * ) Notice: Subject to any disclaimer, the term of this patent is extended or adjusted under 35 U.S.C. 154(b) by 0 days.

(21) Appl. No.: 13/539,306

(22) Filed: Jun. 30, 2012

(65) Prior Publication Data

US 2014/0001425 A1 Jan. 2, 2014

(51) Int. Cl.

| | |
|---|---|
| ***B66F 1/02*** | (2006.01) |
| ***A47B 95/00*** | (2006.01) |
| ***A47B 88/00*** | (2006.01) |
| ***B60P 1/00*** | (2006.01) |
| ***B60P 3/00*** | (2006.01) |
| ***A47B 77/12*** | (2006.01) |
| ***B25B 25/00*** | (2006.01) |
| ***A47B 51/00*** | (2006.01) |
| *B66F 3/00* | (2006.01) |

(52) U.S. Cl.

CPC ........... *A47B 77/12* (2013.01); *Y10T 29/49826* (2015.01); *B25B 25/00* (2013.01); *A47B 51/00* (2013.01); *A47B 2088/0081* (2013.01)

(58) Field of Classification Search

USPC ............... 29/281.1; 254/133 R; 312/311, 312

See application file for complete search history.

(56) References Cited

U.S. PATENT DOCUMENTS

| | | | | |
|---|---|---|---|---|
| 2,543,485 | A | 2/1951 | Briggs | |
| 2,822,229 | A | 2/1958 | Carlson | |
| 3,782,429 | A * | 1/1974 | Barber | 141/359 |
| 5,308,158 | A * | 5/1994 | Vogelgesang et al. | 312/319.3 |
| 6,073,624 | A * | 6/2000 | Laurent | 126/334 |
| 6,238,159 | B1 * | 5/2001 | Pappas | 414/10 |
| 6,902,243 | B2 * | 6/2005 | Bober | 312/306 |
| 6,921,467 | B2 * | 7/2005 | Hanson et al. | 204/212 |
| 6,976,698 | B2 * | 12/2005 | Kuiken | 280/647 |
| 7,043,810 | B2 * | 5/2006 | Bober | 29/401.1 |
| 7,055,802 | B1 | 6/2006 | Jones | |
| 7,090,457 | B2 * | 8/2006 | Martin | 414/277 |
| 7,121,612 | B2 * | 10/2006 | Rasmussen | 296/156 |
| 7,121,613 | B1 * | 10/2006 | Rasmussen | 296/156 |
| 7,322,628 | B2 * | 1/2008 | Kunz | 296/26.13 |
| 7,360,821 | B2 * | 4/2008 | Kunz | 296/165 |
| 7,384,093 | B2 * | 6/2008 | Rasmussen | 296/156 |
| 7,584,705 | B2 * | 9/2009 | Chen | 108/50.01 |
| 7,621,605 | B2 * | 11/2009 | Bond et al. | 312/325 |
| 7,794,027 | B2 * | 9/2010 | Calabria et al. | 312/311 |
| 2004/0163687 | A1 * | 8/2004 | Son et al. | 134/58 D |
| 2004/0164659 | A1 * | 8/2004 | Bober | 312/312 |
| 2005/0057129 | A1 * | 3/2005 | Bober | 312/312 |
| 2007/0018545 | A1 | 1/2007 | Calafria | |
| 2008/0129168 | A1 * | 6/2008 | Banta et al. | 312/333 |
| 2009/0180843 | A1 | 7/2009 | Jackson | |

* cited by examiner

*Primary Examiner* — Lee D Wilson

*Assistant Examiner* — Alvin Grant

(74) *Attorney, Agent, or Firm* — Crose Law LLC; Bradley D. Crose

(57) ABSTRACT

A device, system, and associated methods for appliance lifts are disclosed. The appliance lift sits on the bottom of a cabinet, rolls forward and rotates forward and up using four rotating bars and a gear with spring and damper linking them together. This system consists of a platform dimensioned of a size and shape to support most kitchen counter-top appliances or any other like sized items. The platform is supported by a series of linkages housed in a frame. The frame is then on a moveable track. The entire structure is sized to fit inside the lower section of a standard kitchen cabinet.

9 Claims, 48 Drawing Sheets

APPLIANCE LIFT

FIELD OF THE INVENTION

The technology described herein relates generally to the field of appliance lifts. More specifically, this technology relates to appliance lifts configured for installation within kitchen cabinets, and the like.

BACKGROUND OF THE INVENTION

Remodeling projects, e.g. remodeling of cabinets, are initiated for a variety of reasons, including, but not limited to, organizational improvement, ease of access to cabinet contents, addressing physical limitations and pain from bending while locating and removing hard to reach items. While one approach is removal and replacement of all cabinets, retrofitting existing cabinets is a popular cost-effective solution.

Goals associated with remodeling existing cabinets include: easy access to items in the kitchen, pantry, bathroom, garage or anywhere else a cabinet exists, improving organization, improving accessibility, reducing stress.

A particular problem in kitchen remodeling involves the storage and access to large appliances, e.g. a mixer. Since it is generally desirable to reduce countertop clutter, storage/removal of a heavy mixer in a below-the-waist cabinet can lead to physical problems, e.g. back pain, as well as increasing the potential for accidents, e.g. dropping the mixer on one's foot. A need exists for a solution for ease of storing a heavy appliance, the subsequent access to that heavy appliance, and the transfer of the heavy appliance to a countertop.

Existing appliance lifts mount to the sides of the inside of a cabinet and do not move out of the cabinet before starting to travel upwards. This configuration means that the base cabinet cannot have an existing drawer and must have cabinet sides. These stipulations make it very difficult to retrofit an existing base cabinet.

Existing market devices require a full height cabinet without a drawer below the countertop to work and the cabinet must have two sides.

Previous solutions utilize a path of motion that is primarily limited to a circular arc, translating through an arc typically less than 90 degrees, The prior art depicts solutions that are not housed in a frame and are not self-supporting. The mounting of such devices has limited structural load bearing due to the torque generated by the cantilevered loads only being supported by the opposing torque generated by the mounting bolts on the mounting bracket.

There exists a need to move kitchen appliances and like items from storage in cabinets to countertop locations for use, and back. As some of these items may be of a substantial weight and size to make it difficult for individuals to conveniently and safely do this a solution designed to assist this process is needed. Prior art has attempted to fulfill this need but with compromise and limitations.

Related patents known in the background art include the following:

U.S. Pat. No. 7,055,802, issued to Jones et al. on Jun. 6, 2006, which discloses an appliance lift tool.

U.S. Published Patent Application 2009/0180843, inventor Jackson, et al., published on Jul. 16, 2009, discloses kitchen counter island riser.

U.S. Pat. No. 2,543,485, issued to Briggs on Feb. 27, 1951, which discloses a suspension for cabinet ironers;

U.S. Pat. No. 2,822,229 issued to Carlson on Feb. 4, 1958, which discloses a swinging shelf support; and U.S. Published Patent Application 2007/0018545, inventor Calafria, published on Jan. 25, 2007 discloses a storage bin with lifting mechanism.

The foregoing patent information reflects the state of the art of which the inventor is aware and is tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides a device, system, and associated methods for appliance lifts.

In one exemplary embodiment, the technology described herein provides an appliance lift. The appliance lift sits on the bottom of a cabinet, rolls forward and rotates forward and upward using four rotating bars and a gear with spring and damper linking them together. The appliance lift is comprised of a base plate, a glide out roll, a pull out handle, a back plate, a left gas spring, a right gas spring, a left side plate, a right side plate, a rear lifting arm, a front lifting arm, a standoff, latch mounting, a lock handle, a stop, a front weldment lifting shaft, a gear cover, a rear gear shaft, a rear connecting shaft, a idler gear shaft, a front gear shaft, a front connecting shaft, a lifting arm locking plate, a platform mount, a retainer, a first gear, a second gear, a third gear, a platform top, a platform skirt, a lock shaft, a lock hook, a lock handle, a stop, a stop latch, a stop latch shaft, a stop lock mount a gear shaft, nuts, and a welding jig.

The technology disclosed herein is able to move in a linear and rotational path. The rotational path is able to be greater than 90 degrees while maintaining a substantially level platform throughout the range of motion. Additionally, compared to other solutions that claim to be fulfilling the same or similar need of the current system, the technology disclosed herein is able to be installed in many more applications because it does not have the limitations that of the prior art.

The appliance lift structural components include painted steel and gears as well as other parts of alloy metal. The springs and bearings are steel and stainless steel. The appliance lift is adapted for receiving, lowering and lifting of an appliance.

In a second exemplary embodiment there are several key changes to the unit to lower costs and improve performance. The overall concept remains the same and the key feature of the four bar linkage rotating past center while keeping the lifting platform in a horizontal orientation throughout its path of travel, is still maintained.

Specifically the changes include moving the glide-out rails from a position near the base of the cabinet to a higher position just under the pivot axis of the lifting arms. This change reduces the length of the unsupported unit when in the open/lifted position thus making it more stable for use and less susceptible to movement side to side. This change also allows the removal of the bottom mounting tray, a large heavy steel piece.

Additionally, the two side plates and back plate no longer needed to be at full height and are reduced to six inches tall, saving material and weight. In their place two plywood side plates and a back plate has been added. These are assembled on location allowing for a smaller overall package to be shipped.

The mounting brackets are designed for the installation process that allows for more adjustability, better allowing an installer to fit the unit to various cabinet configurations and sizes. These brackets tie the unit more firmly into the cabinet and allow for greater stability of the unit once properly installed.

The lifting platform is made out of thinner, lighter material to save weight, which results in a reduction in material and shipping costs. The back edge of the platform is extended downward to allow for greater contact area with the front edge of the counter top.

The lifting arms themselves are simplified to save in manufacturing and material costs.

In an exemplary embodiment the method of installing the technology described herein is as follows:

Step 1: Attaching hardware to wood side panels.

Step 2: Assembling Wood Frame

Step 3: Positioning Floor Brackets

Step 4: Placing Wood Frame in Cabinet and Securing Upper Bracket to Frame

Step 5: Screwing Down Floor Bracket

Step 6 Securing Upper Bracket to Cabinet Frame Under Drawer

Step 7: Attaching Appliance Lift to Wood Frame

Step 8: Operating the Unit

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the technology disclosed herein pertains to not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the technology described herein. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Figure 1:
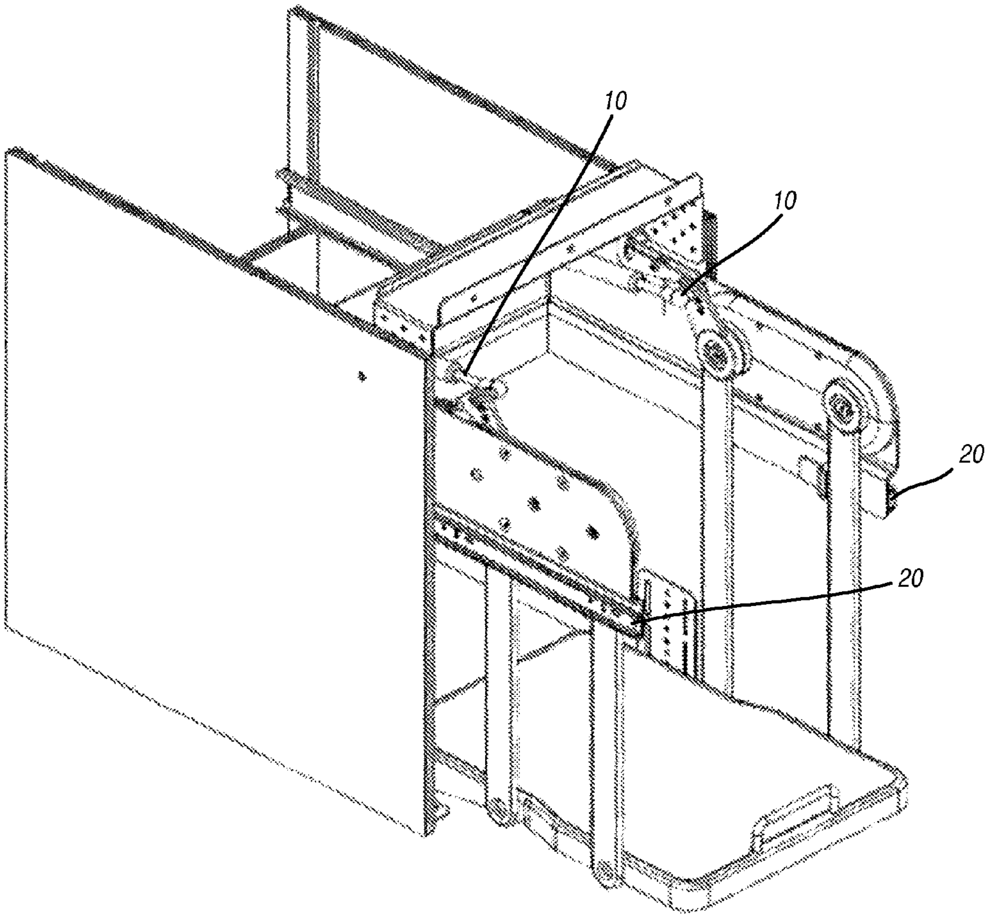
FIG. 1 is a front perspective view of an appliance lift, according to an embodiment of the technology described herein.
Figure 2:
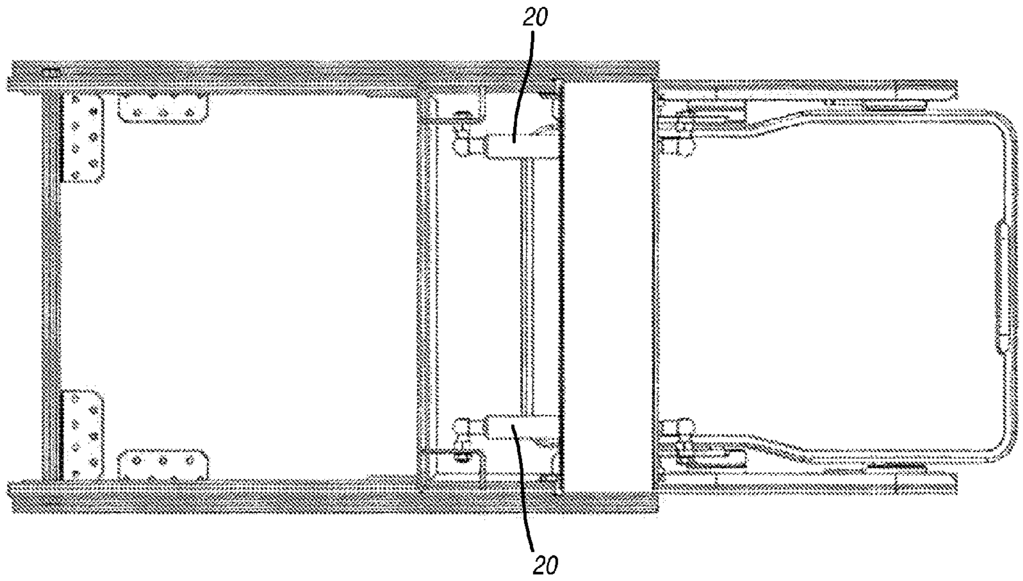
FIG. 2 is a top plan view of an appliance lift, according to an embodiment of the technology described herein.
Figure 3:
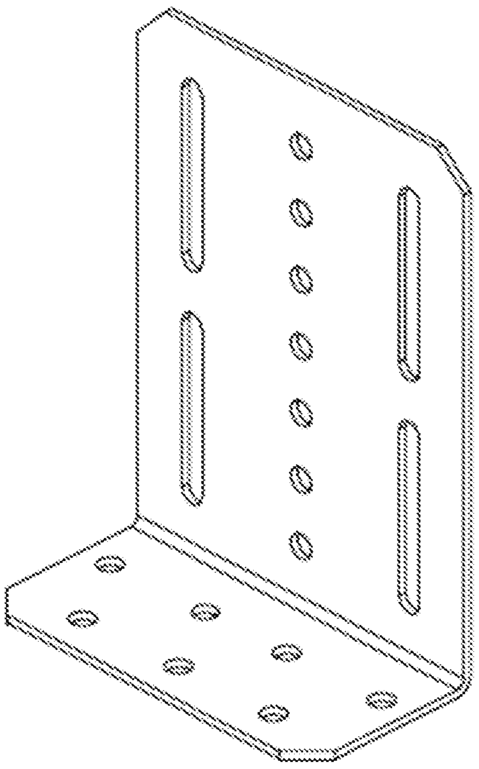
FIG. 3 is a perspective view of a L-bracket, according to an embodiment of the technology described herein.
Figure 4:
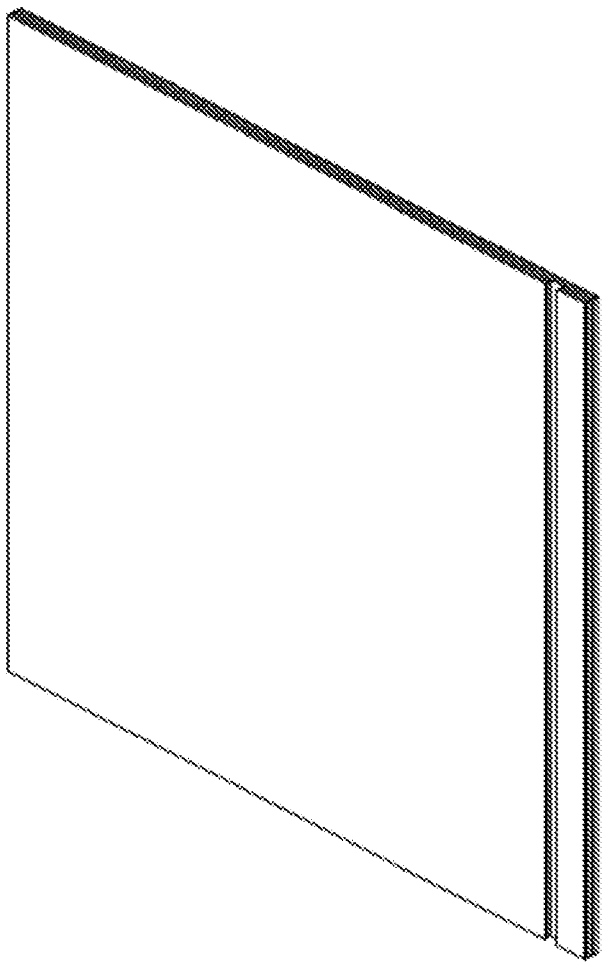
FIG. 4 is a perspective view of a left side plate, according to an embodiment of the technology described herein.
Figure 5:
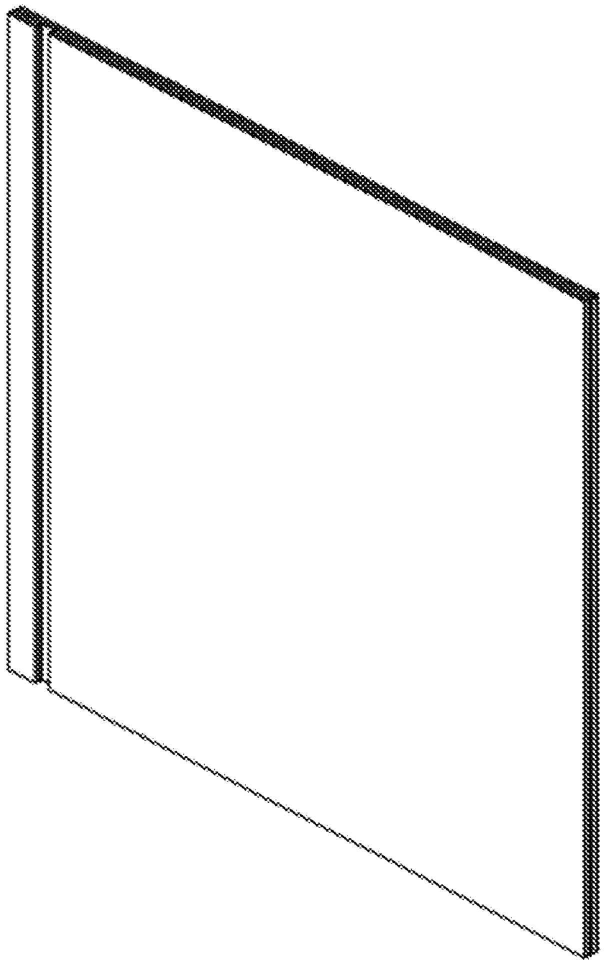
FIG. 5 is a perspective view of a right side plate, according to an embodiment of the technology described herein.
Figure 6:
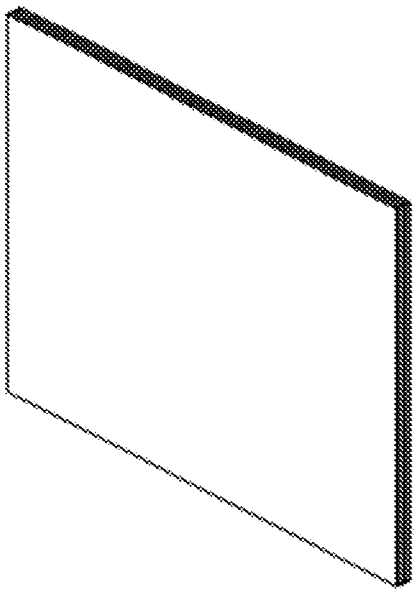
FIG. 6 is a perspective view of a back plate, according to an embodiment of the technology described herein.
Figure 7:
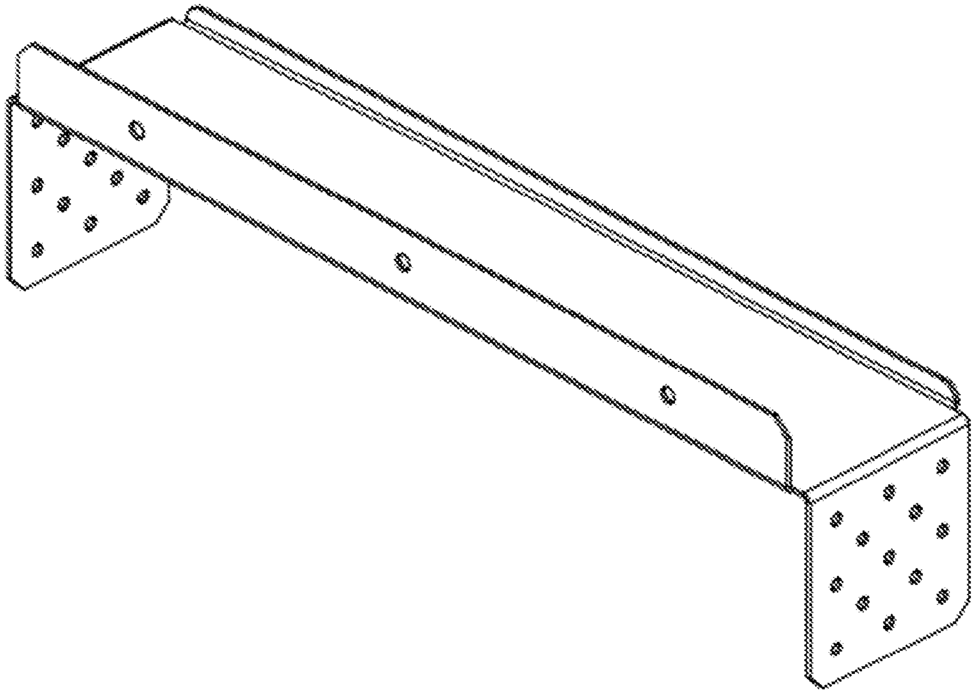
FIG. 7 is a perspective view of a top bracket, according to an embodiment of the technology described herein.
Figure 8:
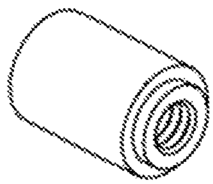
FIG. 8 is a perspective view of a front gear shaft, according to an embodiment of the technology described herein.
Figure 9:
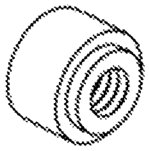
FIG. 9 is a perspective view of an idler gear shaft, according to an embodiment of the technology described herein.
Figure 10:
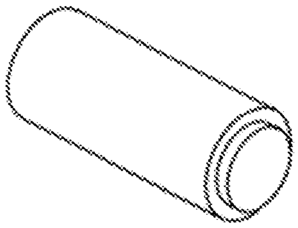
FIG. 10 is a perspective view of a left side plate, according to an embodiment of the technology described herein.
Figure 11:
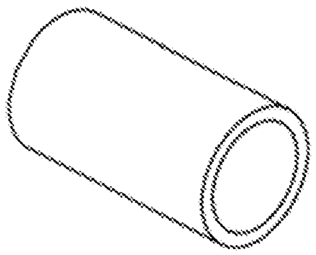
FIG. 11 is a perspective view of a rear bronze bushing, according to an embodiment of the technology described herein.
Figure 12:
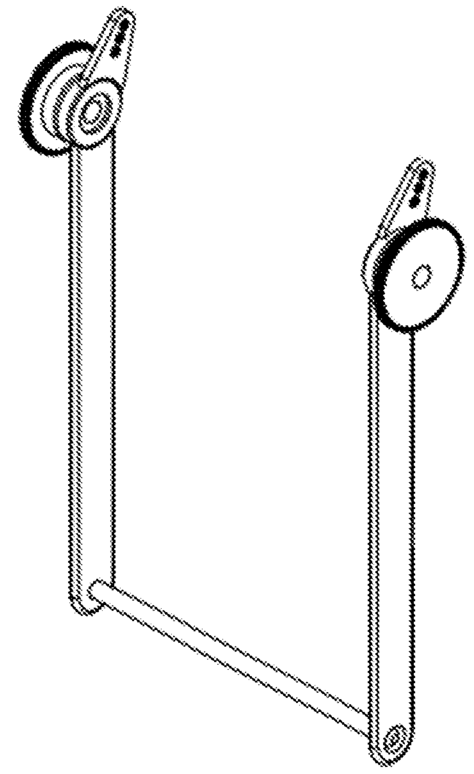
FIG. 12 is a perspective view of a rear lifting arm weldment, according to an embodiment of the technology described herein.
Figure 13:
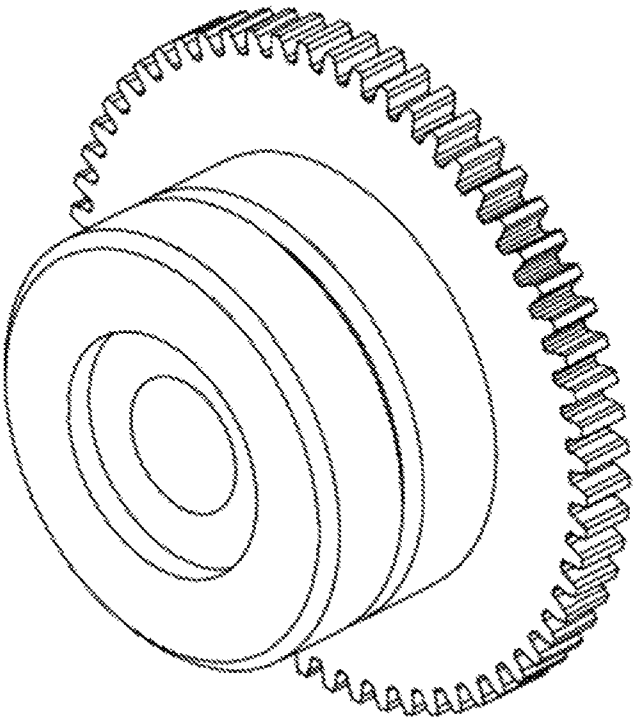
FIG. 13 is a perspective view of a rear gear, according to an embodiment of the technology described herein.
Figure 14:
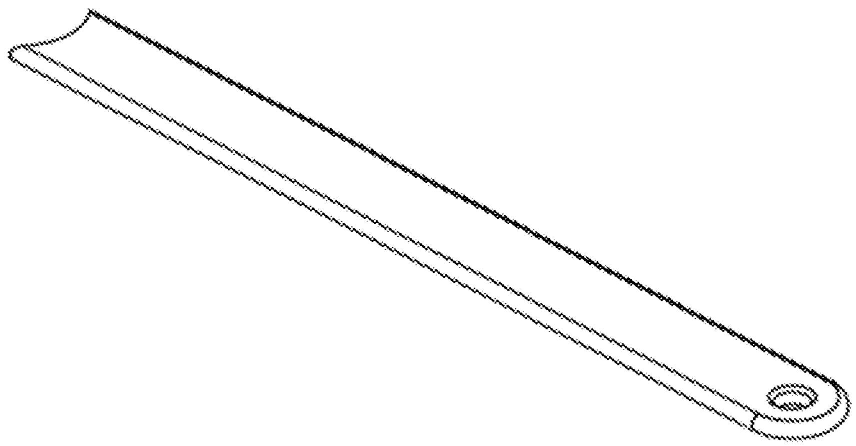
FIG. 14 is a perspective view of a lifting arm, according to an embodiment of the technology described herein.
Figure 15:
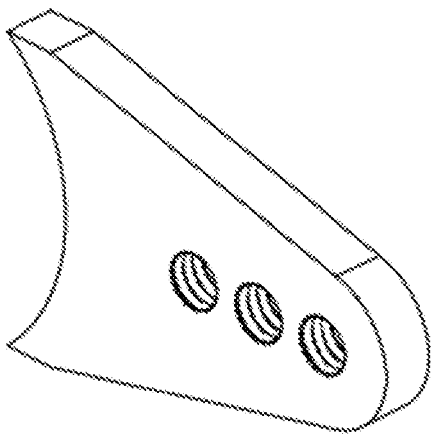
FIG. 15 is a perspective view of an attachment bracket, according to an embodiment of the technology described herein.
Figure 16:
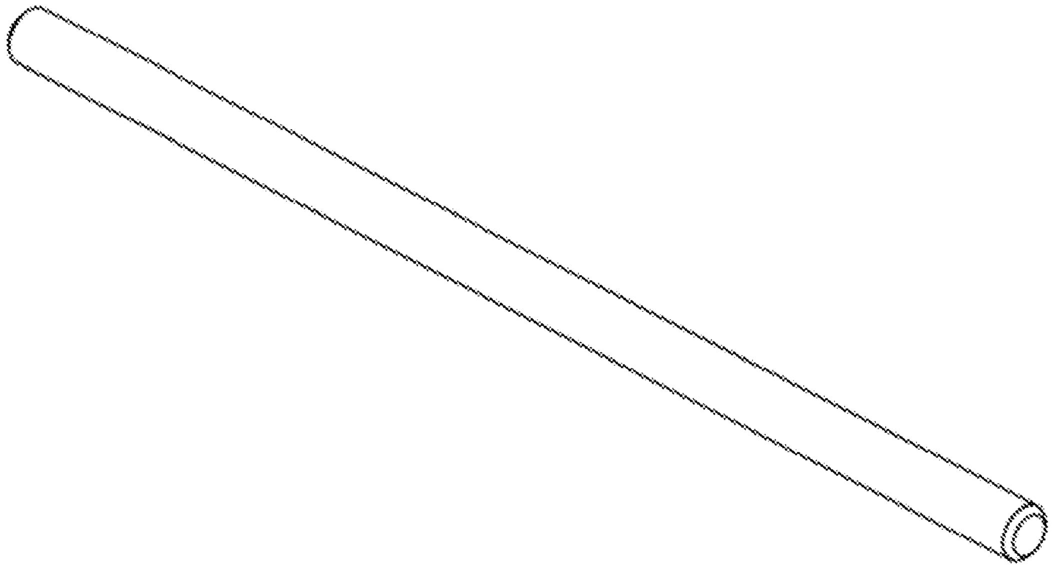
FIG. 16 is a perspective view of a rear connecting shaft, according to an embodiment of the technology described herein.
Figure 17:
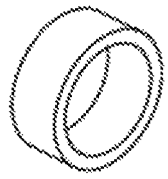
FIG. 17 is a perspective view of a bronze idler bushing, according to an embodiment of the technology described herein.
Figure 18:
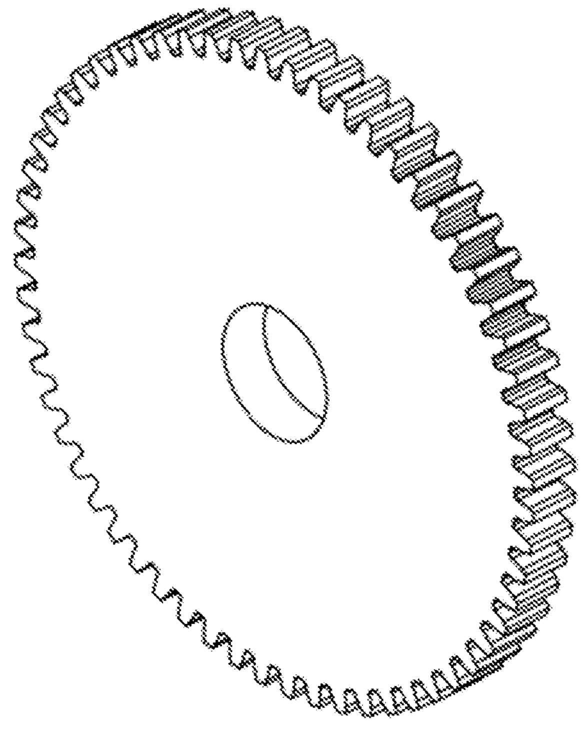
FIG. 18 is a perspective view of a idler gear, according to an embodiment of the technology described herein.
Figure 19:
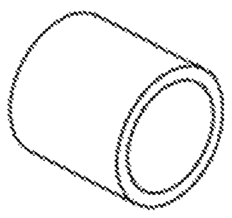
FIG. 19 is a perspective view of a front bronze bushing, according to an embodiment of the technology described herein.
Figure 20:
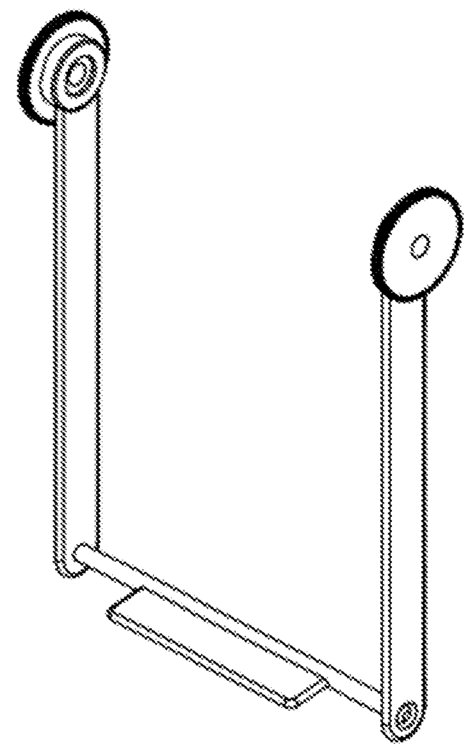
FIG. 20 is a perspective view of a front lifting arm weldment, according to an embodiment of the technology described herein.
Figure 21:
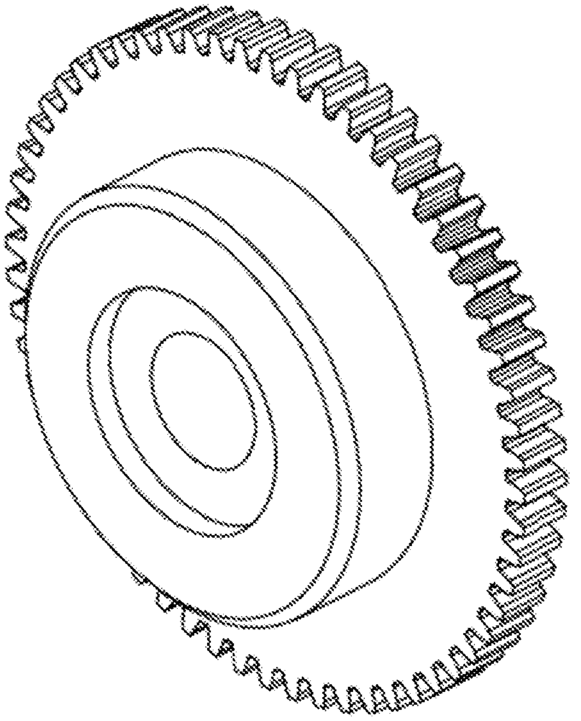
FIG. 21 is a perspective view of a front gear, according to an embodiment of the technology described herein.
Figure 22:
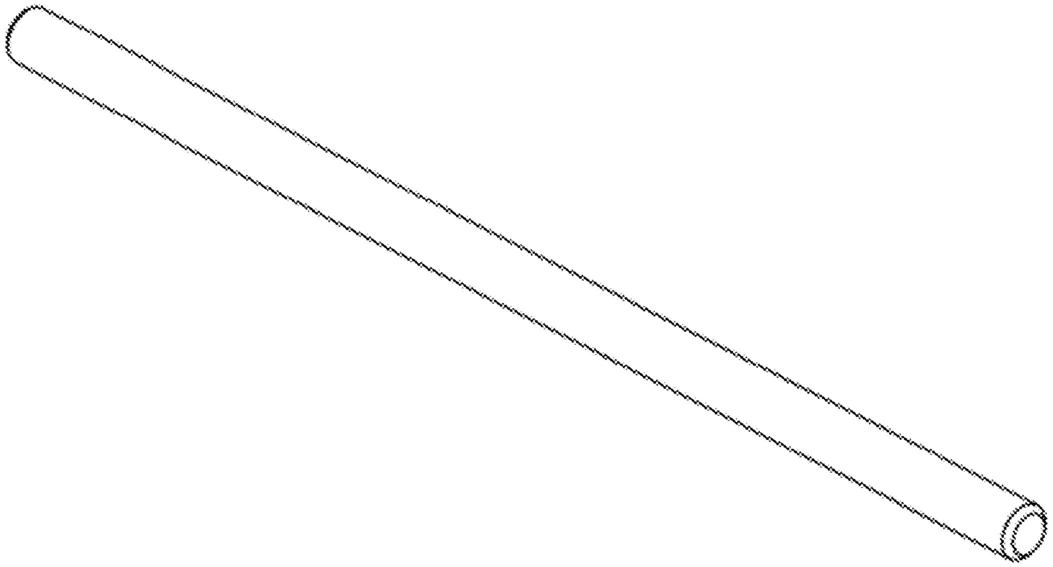
FIG. 22 is a perspective view of a front connecting shaft, according to an embodiment of the technology described herein.
Figure 23:
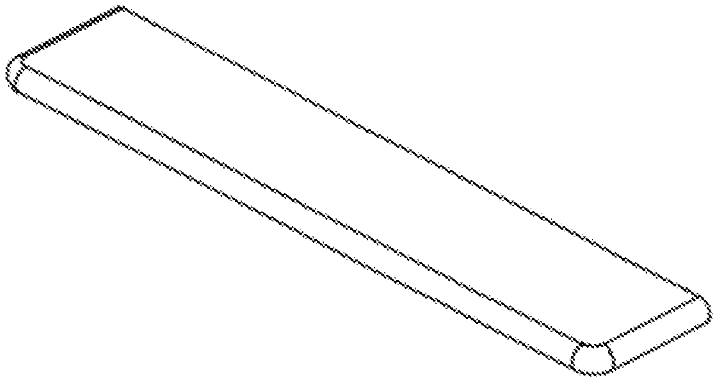
FIG. 23 is a perspective view of a lifting arm locking plate, according to an embodiment of the technology described herein.
Figure 24:
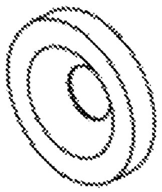
FIG. 24 is a perspective view of a retainer, according to an embodiment of the technology described herein.
Figure 25:
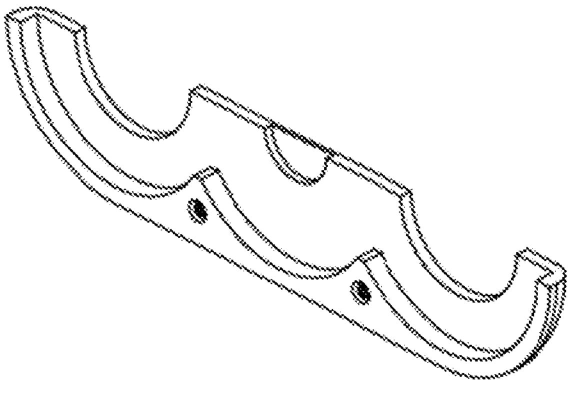
FIG. 25 is a perspective view of a gear cover, according to an embodiment of the technology described herein.
Figure 26:
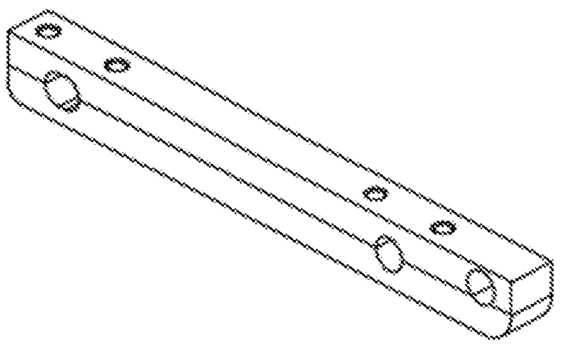
FIG. 26 is a perspective view of a platform mount, according to an embodiment of the technology described herein.
Figure 27:
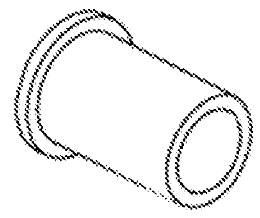
FIG. 27 is a perspective view of a plastic bushing, according to an embodiment of the technology described herein.
Figure 28:
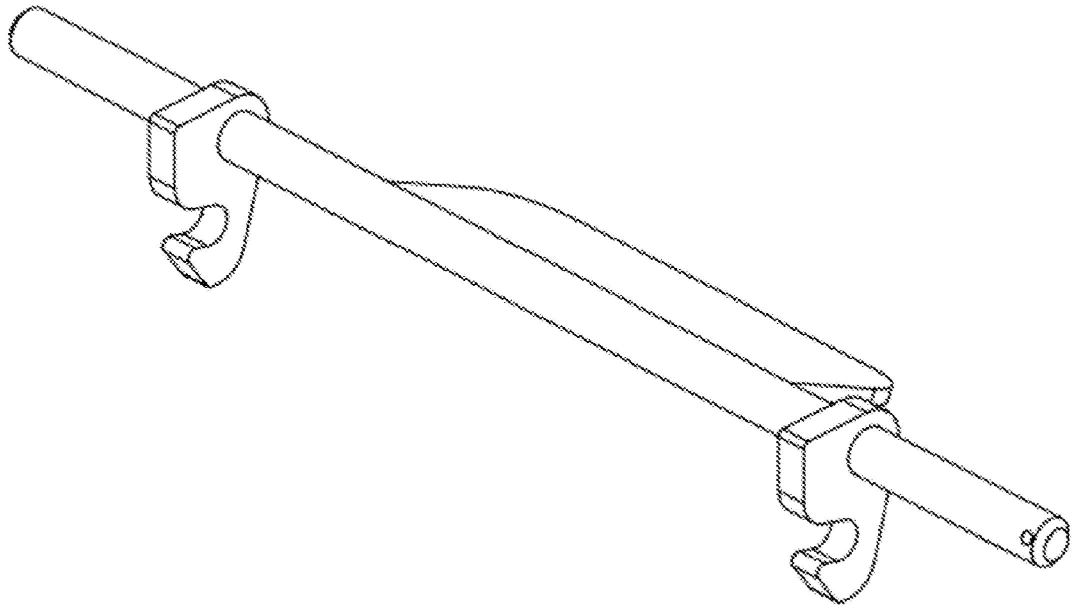
FIG. 28 is a perspective view of a lock shaft weldment, according to an embodiment of the technology described herein.
Figure 29:
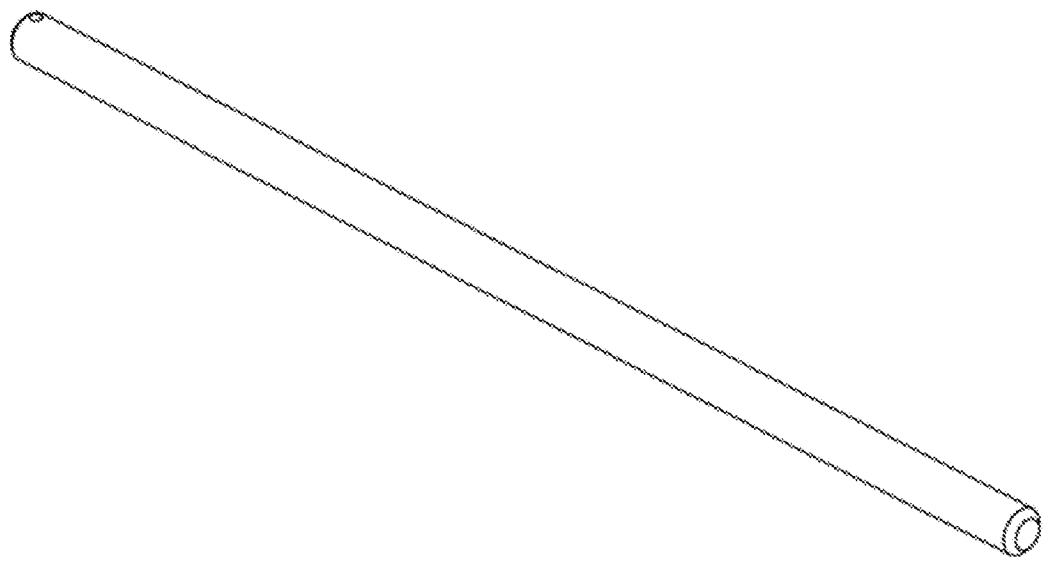
FIG. 29 is a perspective view of a locking shaft, according to an embodiment of the technology described herein.
Figure 30:
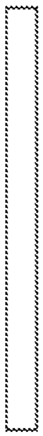
FIG. 30 is a perspective view of a locking handle, according to an embodiment of the technology described herein.
Figure 31:
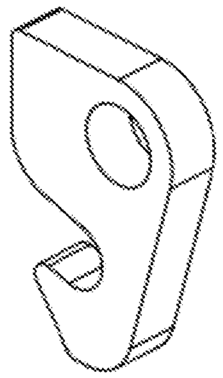
FIG. 31 is a perspective view of a locking hook, according to an embodiment of the technology described herein.
Figure 32:
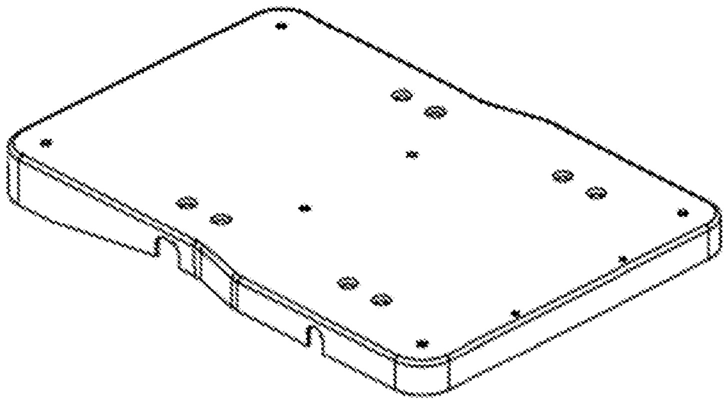
FIG. 32 is a perspective view of an appliance platform, according to an embodiment of the technology described herein.

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a device, system, and associated methods for appliance lifts.

Referring now to FIGS. 1 through 48, an appliance lift is shown. The technology described herein can be utilized with various appliances.

The technology disclosed herein pertains to a mechanical device to assist lifting heavy objects from inside cabinets up to counter-top height by using a combination of linkages and mechanical components to produce motion that maintains a substantially level orientation throughout the path of operation.

The technology disclosed herein pertains to a mechanical device that is designed to store, transport, move, and support common kitchen appliances such as kitchen mixers etc. and like items of similar weight and size, from inside a standard kitchen cabinet to standard kitchen counter height with a minimum of effort on the part of the user.

This system consists of a platform dimensioned of a size and shape to support most kitchen counter-top appliances or any other like sized items. The platform is supported by a series of linkages housed in a frame. The frame is then on a moveable track. The entire structure is sized to fit inside the lower section of a standard kitchen cabinet. This system includes a handle by which the user can operate the device. This system includes a track mechanism and an associated latching or locking mechanism to securely hold the system in proper position during operation. This system includes a linkage designed to maintain the platform in a substantially level or horizontal position at all times when operating through the devices range of motion. This system also includes a mechanism such as a gas spring, mechanical spring or other device to provide a force to assist in the raising of the platform through and input from the user. This device includes a latching or locking device to securely hold the platform and mechanism once in the elevated position for use.

This system is able to perform its function and fulfill the above cited needs without the limitations of the prior art and is therefore able to be used in a broader range of applications.

An exemplary embodiment of the appliance life system is comprised of a frame mounted to a horizontal slide. The slide is mounted to a mounting plate or bracket for installation into a cabinet. To the top of the frame is mounted a hanging modified four bar linkage which supports a platform, in a fashion similar to a swing. The four bar linkage has the two parallel swinging links' movement tied together through a system of gears, external gear subassemblies 50. The swinging links are also attached to a gas charged spring/damper to provide a lifting force. The motion of the platform is first horizontal to a predetermined point that has a locking mechanism to hold the frame in that location while the movement of the platform continues in elevation through the rotation of the lifting arms. This elevation movement has a self-engaging lock to hold the unit in the desired location during use. A release mechanism is provided to allow the platform to be returned to its lower position. This action then releases the horizontal locking mechanism to allow the horizontal movement back into the cabinet. The attachment point of the gas spring 10 is such that it moves past the center pivot point of the lifting arm to provide a minimum holding force of the platform in the frame. This feature allows the horizontal movement to happen first prior to the elevation movement, as the force required to overcome the horizontal movement is less than that generated by the holding force of the gas springs 10.

Alternate embodiments of the system can also have one or more of the following:

- An adjustment mechanism to vary the amount of assisting force provided to accommodate items of various weights.
- A latching or locking mechanism that allows for locking the platform in various positions that can be easily engaged and released. This mechanism can have fine positional adjustment to hold the platform in potentially any location throughout its range of travel.
- A mechanism to adjust the stop location 30 on stop arm 40 of the pull-out movement in order to vary the distance of the horizontal movement of the device and to securely lock and hold the device in that position during operation is provided.

Additional elements can be added to the platform to assist in the holding or positioning of specific and nonspecific items, such as, but not limited to, walled containers, turntables, mounts, locating pins, clamps, hooks, etc.

In yet another embodiment the appliance lift system is comprised of:

A base mounting plate that attaches the entire unit to the base of a cabinet; this base also serves as a mounting location for the mechanical components that provide the horizontal movement; this base also serves as the mounting location for a stop and or latching/locking mechanism for the horizontal movement.

A frame structure consisting of side plates/legs and a back plate which provides a structural tie in for the side plates, mounting location for latching/locking components and stops for the movement of the platform; this frame being substantially attached, connected to, or affixed to the horizontal movement components.

Attached to this frame is a series of components/linkages arranged in such a manner as to provide movement of the platform attached to the components/linkages; the path of this movement is a combination of horizontal translation and elevation through rotational movement of the components/linkages of more than 90 degree the subject of this movement, the platform and various items to be moved that are placed on said platform, is primarily maintained in a horizontal, level orientation throughout the duration the movement and held in place by a latching/locking mechanism at the end of movement; this path of movement of the platform is accomplished by configuring the component linkages in a standard four bar linkage design.

The technology described herein enhances this design of the four bar linkage by offsetting the swinging link arms in the Z direction relative to the plane of motion to allow one link to bypass the other, thus allowing for movement greater than 90 degrees. In addition, the rotation of one swing arm relative to the other is tied together by a mechanical or electrical means such as gears, chain, belts, or some other suitable method to ensure movement of both swing arms in unison.

Finally, due to the variations inherent in the manufacturing environment and natural flex and give of various components, instead of attaching the swinging ends of the lifting arms to fixed pivot points as would be the case in a standard four bar linkage and is in fact done in the prior art, this new invention allows one of the lifting arms to be attached to its pivot point such that it is free to pivot but its movement is restricted in the Y or vertical direction while allowing a small amount of movement in the X or horizontal direction. This tolerance of movement allows this linkage to function in practical application. Attached between the frame and the lifting arms of this system is a component or system of components capable for generating force to assist in lifting or counterbalance the loads of the items being lifted. Such components could be mechanical or electrical, and be any one or, combination of, readily available springs, belts, levers, gas charged shocks, motors, solenoids etc.

The technology disclosed herein is versatile in installation. The mounting of the frame to the base of the cabinet produces less torque forces due to the applied loads and is offset by a much greater resistance to that torque by the nature of the design of the attachment of the frame to the base. This type of cabinet is a non-standard design and rarely found in home applications. In order to install the prior art, existing cabinets must be modified by means of removing the drawer and creating a custom full height door. This new invention is superior to this in that it requires no such modification to the cabinet nor does it require the user to give up a functioning storage drawer.

Prior known solutions that use a similar four bar linkage has a limited movement do to interference with its own integral linkage members. This limitation prevents any movement of the supporting platform to a position higher than its mounting, and thus cannot raise its platform to the height equal to that of the countertop.

The linkage in the technology described herein allows for movement above its pivoting/mounting point to reach full counter top height. Prior known solutions work off a single, swing-like mechanism and motion which limits the range of installations. This technology described herein uses a combination of linkages and mechanical components to provide a horizontal translational movement and a rotational movement to facilitate achieving the desired motion.

The technology disclosed herein has mounting of the unit to the base of the cabinet, a more consistent mounting location as compared to side walls. This has the advantage of being more readily installed in a broader range of cabinets. Additionally, this configuration offers greater strength and stability. With its mounting points spread out over a larger distance this system is better able to offer resistance to the torque loads generated by the applied loads. This system allows for greater range of movement and stability.

In a second exemplary embodiment several key changes to the above embodiment are made to lower costs and improve performance. The overall concept remains the same and the key feature of the four bar linkage rotating past center while keeping the lifting platform in a horizontal orientation throughout its path of travel, is still maintained.

Specifically the changes to the above embodiment include moving the glide-out rails 20 (drawer members), 60 (cabinet members) from a position near the base of the cabinet to a higher position just under the pivot axis of the lifting arms. This change reduces the length of the unsupported unit when in the open/lifted position thus making it more stable for use and less susceptible to movement side to side. This change also allows the removal of the bottom mounting tray, a large heavy steel piece.

Additionally, the two side plates and back plate no longer needed to be at full height and are reduced to six inches tall, saving material and weight. In their place two plywood side plates and a back plate has been added. These are assembled on location allowing for a smaller overall package to be shipped.

New mounting brackets are designed for the installation process that allows for more adjustability, better allowing an installer to fit the unit to various cabinet configurations and sizes. These brackets tie the unit more firmly into the cabinet and allow for greater stability of the unit once properly installed.

The lifting platform is made out of thinner, lighter material to save weight, which results in a reduction in material and shipping costs. The back edge of the platform is extended downward to allow for greater contact area with the front edge of the counter top.

The lifting arms themselves are simplified to save in manufacturing and material costs.

In an exemplary embodiment the method of installing the technology described herein is as follows:

Step 1: Attaching hardware to wood side panels.

Step 2: Assembling Wood Frame

Step 3: Positioning Floor Brackets

Step 4: Placing Wood Frame in Cabinet and Securing Upper Bracket to Frame

Step 5: Screwing Down Floor Bracket

Step 6 Securing Upper Bracket to Cabinet Frame Under Drawer

Step 7: Attaching Appliance Lift to Wood Frame

Step 8: Operating the Unit

Step 1: Attach Hardware to Wood Side Panels.

There are 3 separate components that make up the wood frame in which the appliance lift will rest. The frame consists of two wood Side Panels (left and right side) and one wood Back Panel.

Left Side Panel

Figure 33:
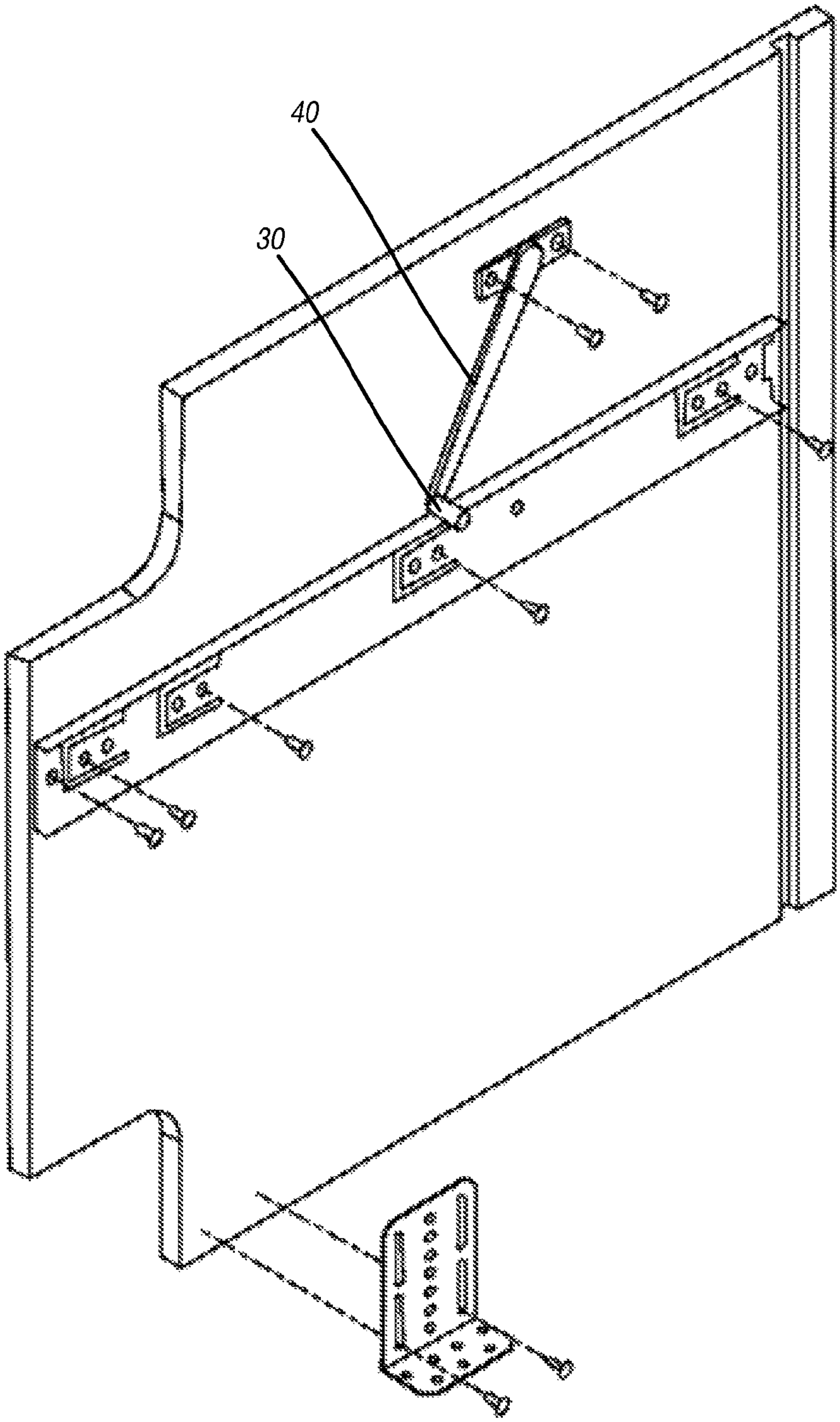
FIG. 33 is a perspective view of a left side panel, according to an embodiment of the technology described herein.

1. Use the screws to mount the rail cabinet member and rail “stop” arm to the Left Side Panel. The cabinet member may need to be separated from the rest of the rail in order to be mounted. It may be helpful to mark a line along the wood side panel with a pencil to show where the rail cabinet member centerline should be (330 mm above the bottom of the panel as shown). Be sure to use the appropriate amount of screws to mount the rail onto the side panel (5 screws for rail, 2 for rail “stop” arm). If necessary, use a level to ensure that the rail cabinet member is exactly parallel to the ground
2. After mounting the rails and rail stops, it is time to attach the floor mounting bracket. Mount the bracket as shown in FIG. 33 using 2 screws in the slotted holes only. Do not fully screw in these screws as it will be difficult to move the bracket later. The bracket should be able to slide up and down vertically without too much effort. The bracket will be fully screwed into place after determining the proper vertical position in Step 3.

Right Side Panel

Figure 34:
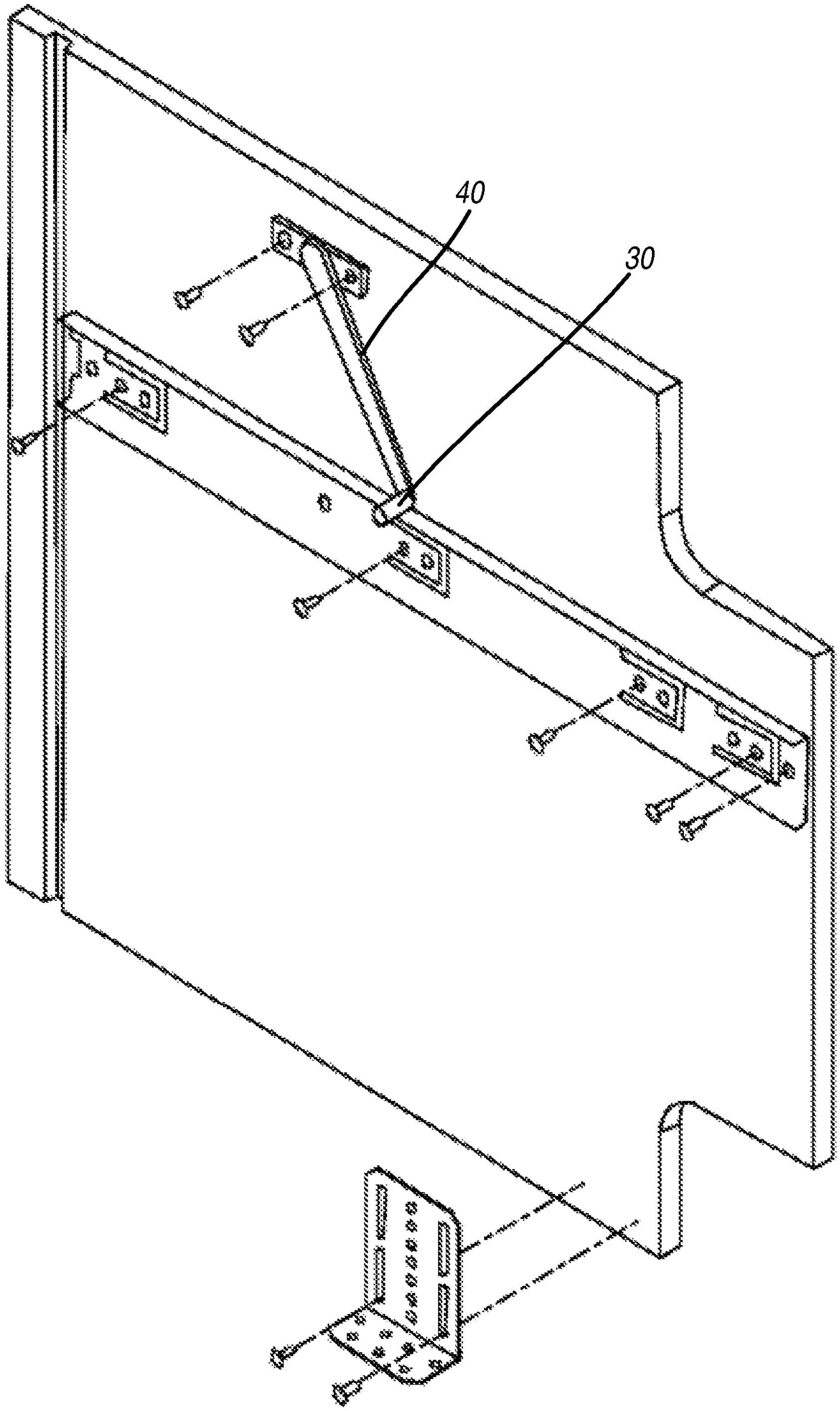
FIG. 34 is a perspective view of a right side panel, according to an embodiment of the technology described herein.
Figure 35:
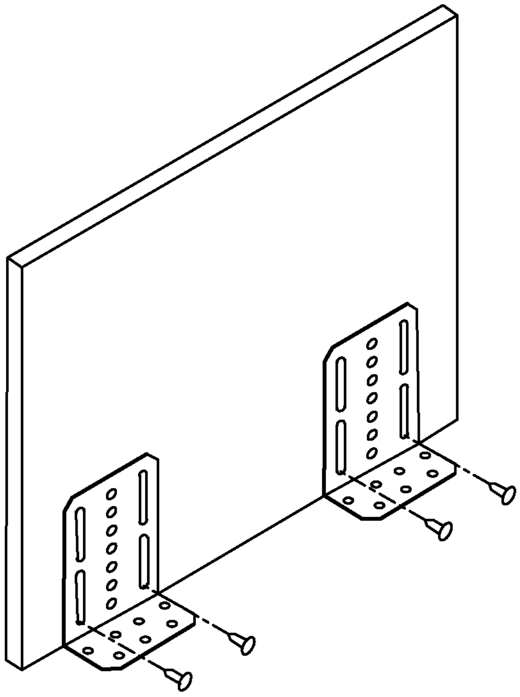
FIG. 35 is a perspective view of a back panel, according to an embodiment of the technology described herein.
Figure 36:
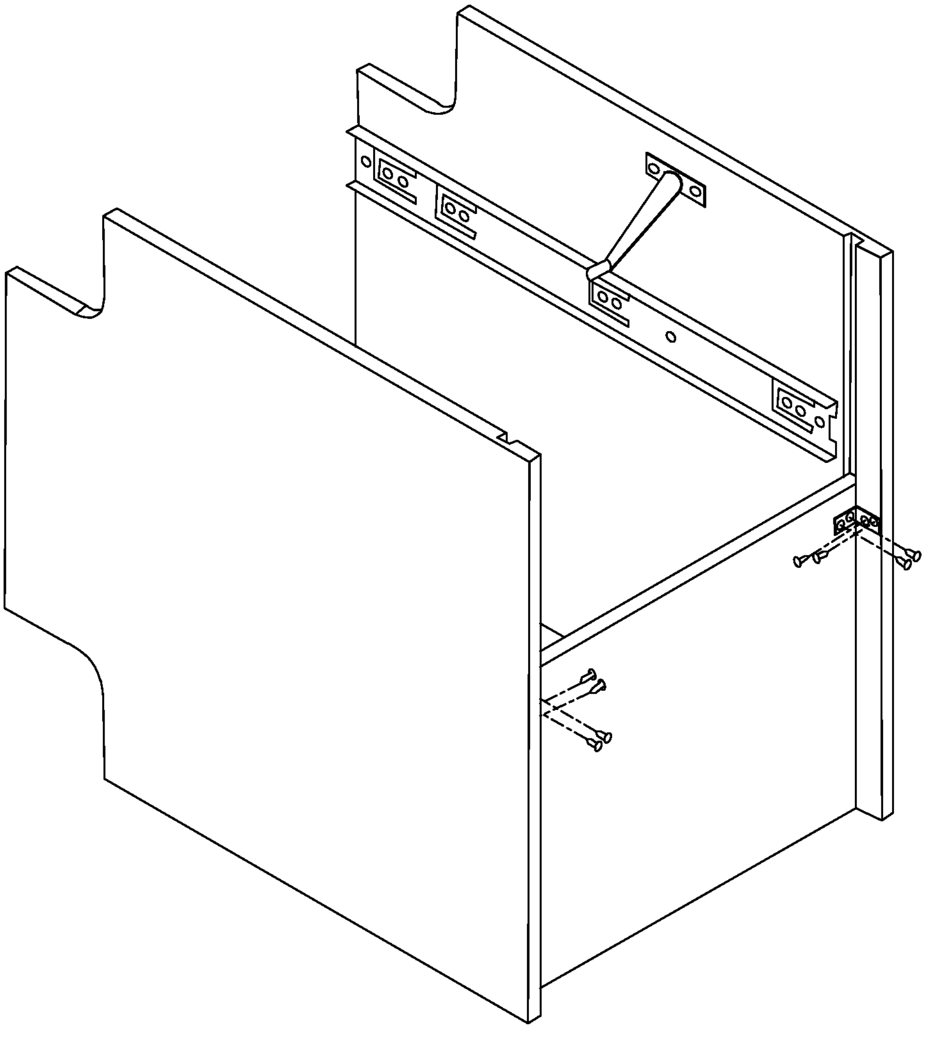
FIG. 36 is a perspective view of a wood frame assembly, according to an embodiment of the technology described herein.
Figure 37:
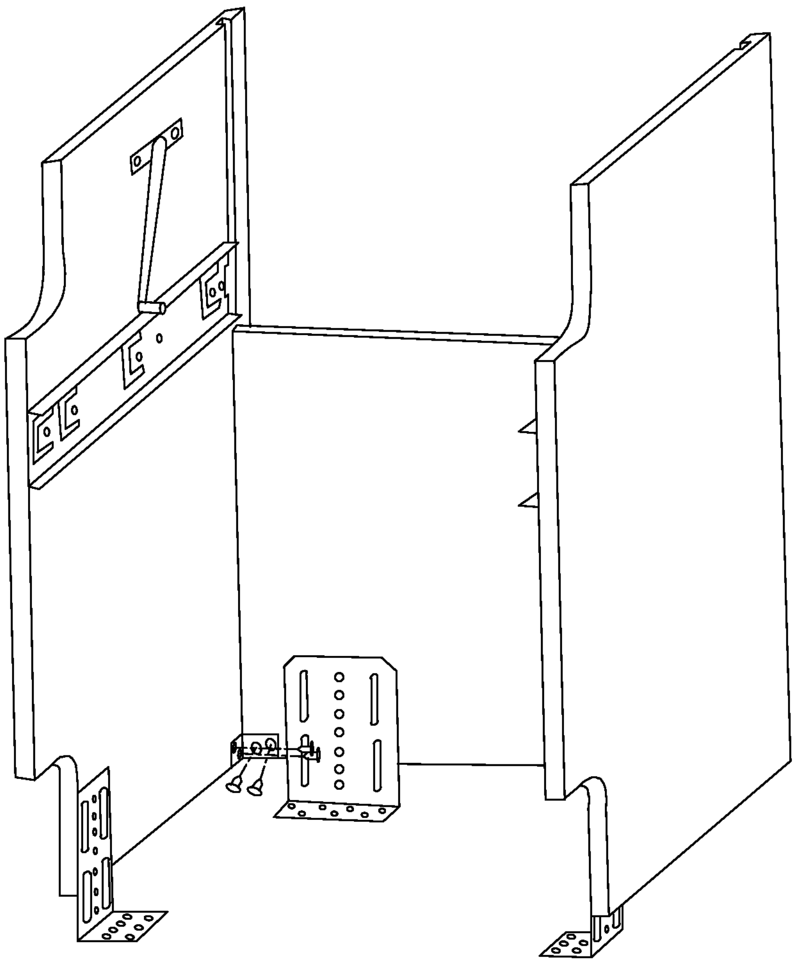
FIG. 37 is a front perspective view of a wood frame assembly, according to an embodiment of the technology described herein.

1. Attach the hardware to the Right Side Panel. This panel will be a mirror image of the Left Side Panel. Mount the rails and rail stops to the Right Side Panel. Be sure to use the appropriate amount of screws to mount the rail onto the side panel (5 screws for rail, 2 for rail “stop” arm).
2. Mount the bracket as shown in FIG. 34 using 2 screws in the slotted holes only. Do not fully screw in these screws as it will be difficult to move the bracket later. The bracket should be able to slide up and down vertically without too much effort. The bracket will be fully screwed into place after determining the proper vertical position in Step 3.

Back Panel

1. The Back Panel is assembled by attaching two floor brackets to the panel with 4 screws. Do not fully screw in these screws as it will be difficult to move the bracket later. See FIG. 35 for the proper screw and bracket position.

Step 2: Assemble Wood Frame: Now the 3 wood panels from the previous section can be assembled together. The Wood back panel fits in the dado grooves located on the inside side panels. Use 4 small “L” mounting brackets to attach the wood panels together. Each bracket is attached with 4 screws (#6×0.5 inch). Reference FIGS. 36 and 37.

Step 3: Position Floor Brackets: In order to achieve the proper height of the mixer platform in the upright position, you will first need to measure the cabinet that you will be installing the lift into. Based on this dimension, you may need to adjust the 4 floor brackets to a different height position. Measure the distance between the bottom of the cabinet and the top of the countertop. If this distance is less than 756 mm (29.75 inches), you will not need to re-position the floor brackets. If this distance is greater than 756 mm, you may need to adjust the brackets in order for the mixer platform to sit exactly flush with the countertop when the unit is in the upright position.

Final Floor Bracket Adjustment: Use two screws (#6×0.5 inch) to secure each bracket into place. Use the holes in the center of the brackets as shown below.

Figure 38:
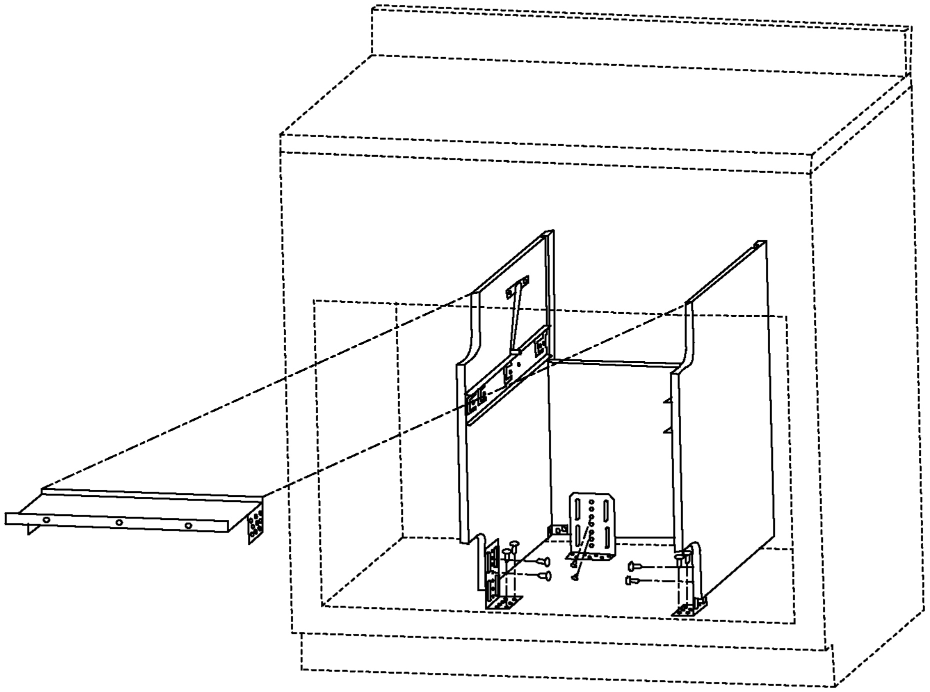
FIG. 38 illustrates a final floor bracket adjustment—screwing brackets into place, according to an embodiment of the technology described herein.
Figure 39:
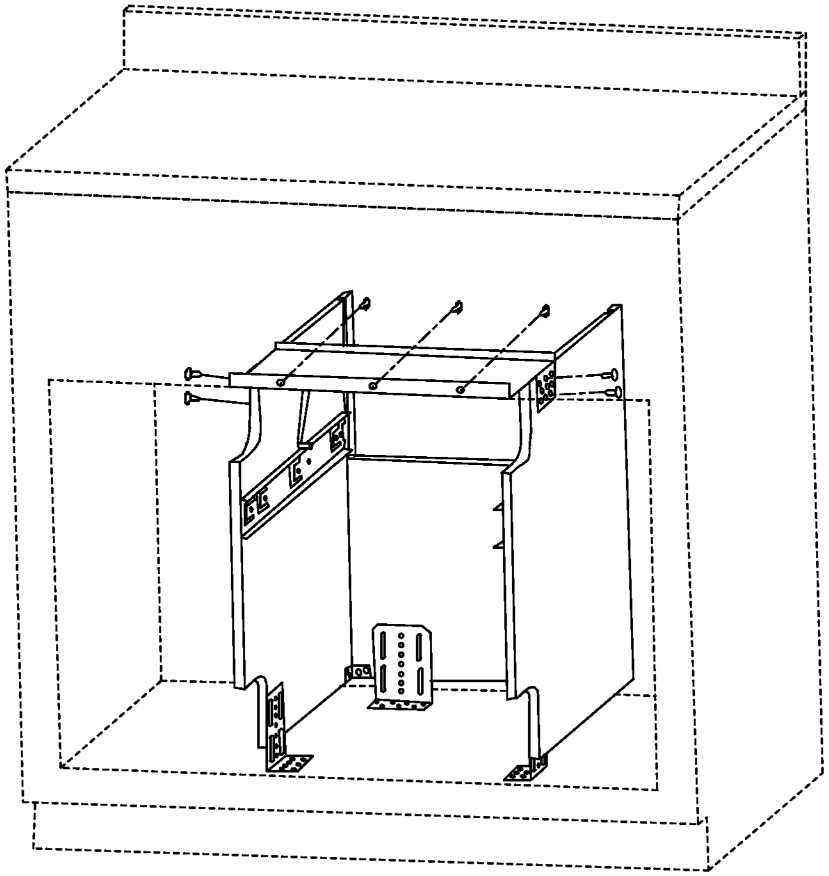
FIG. 39 illustrates placing the frame inside a cabinet, according to an embodiment of the technology described herein.
Figure 40:
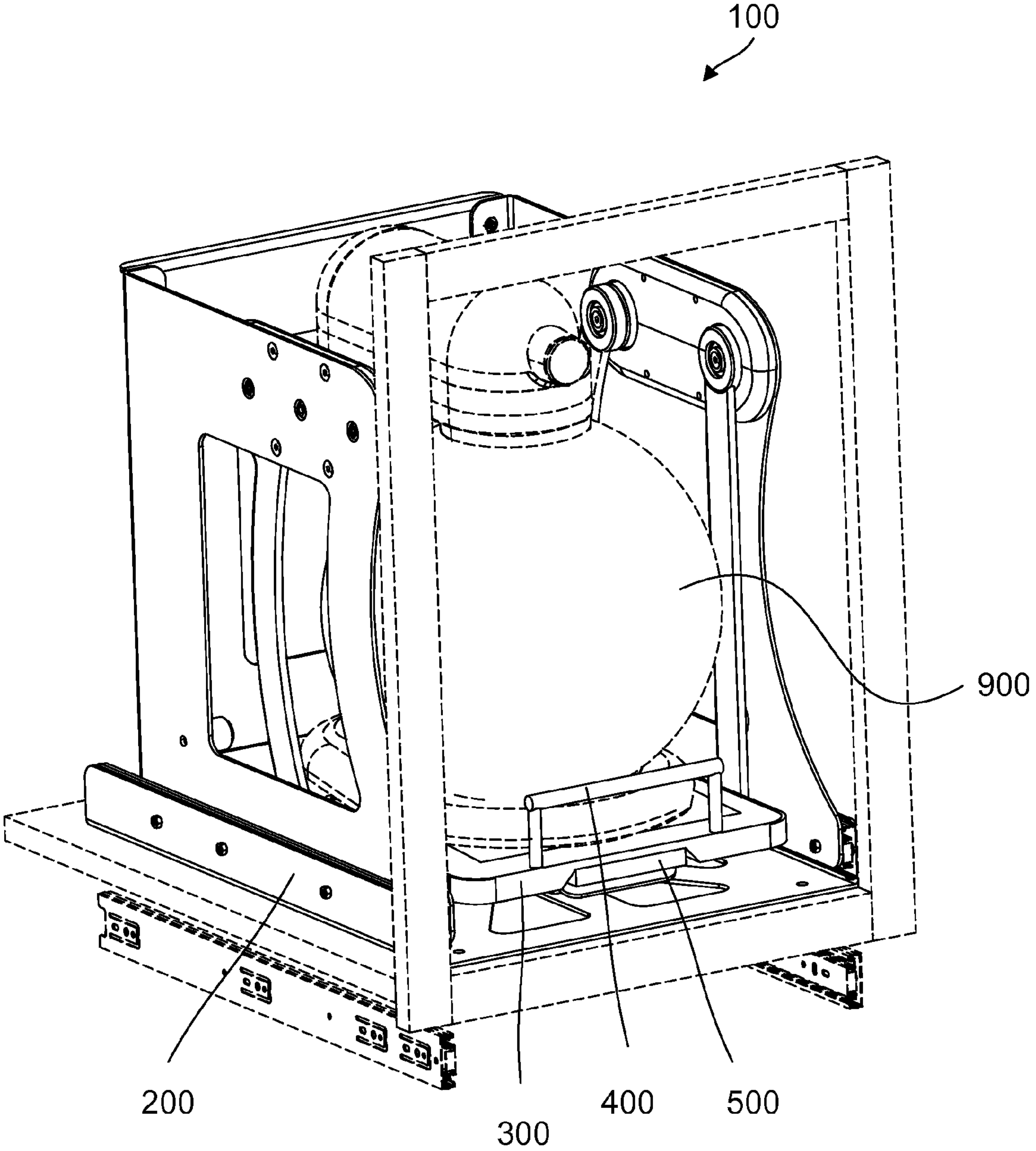
FIG. 40 is a perspective view of an appliance lift with a representative appliance, according to an embodiment of the technology described herein.
Figure 41:
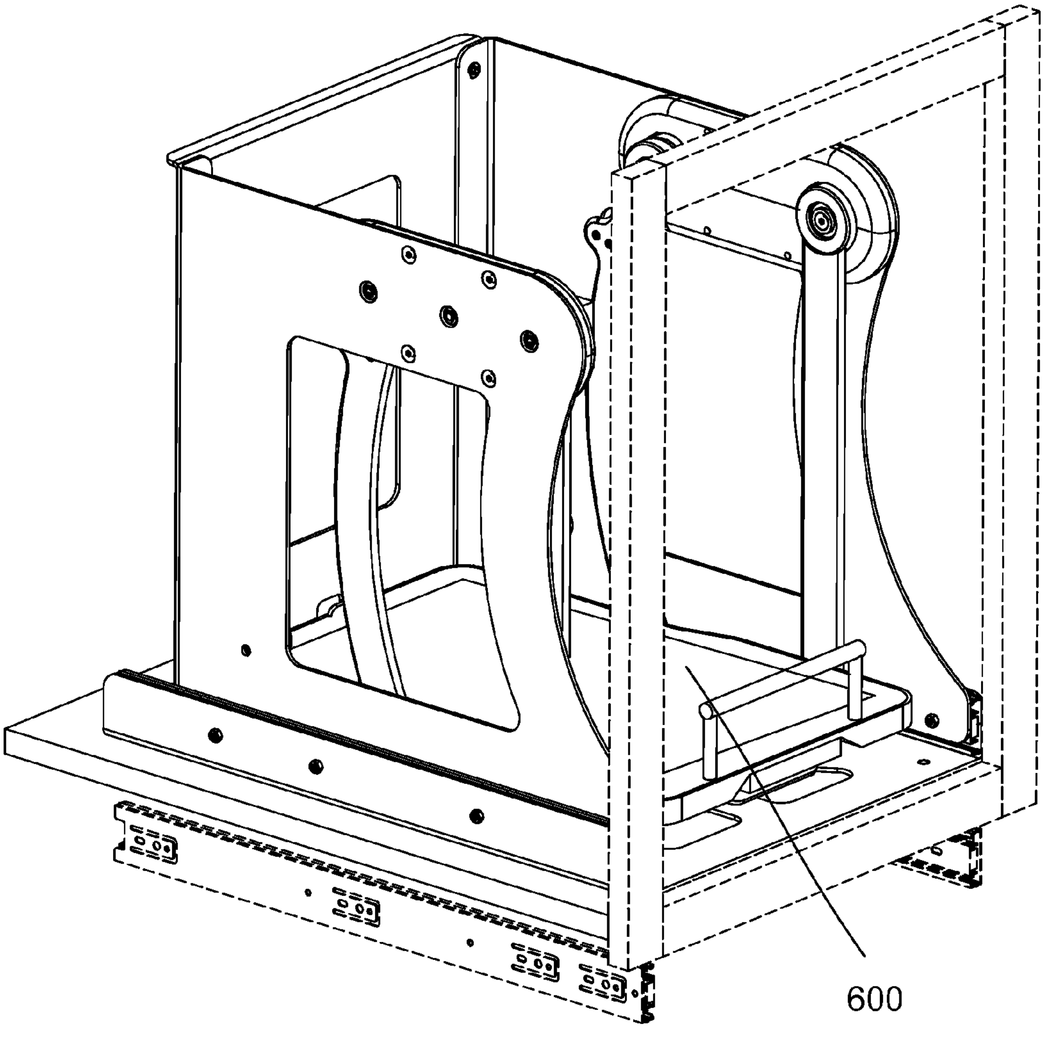
FIG. 41 is a perspective view of an appliance lift, according to an embodiment of the technology described herein.
Figure 42:
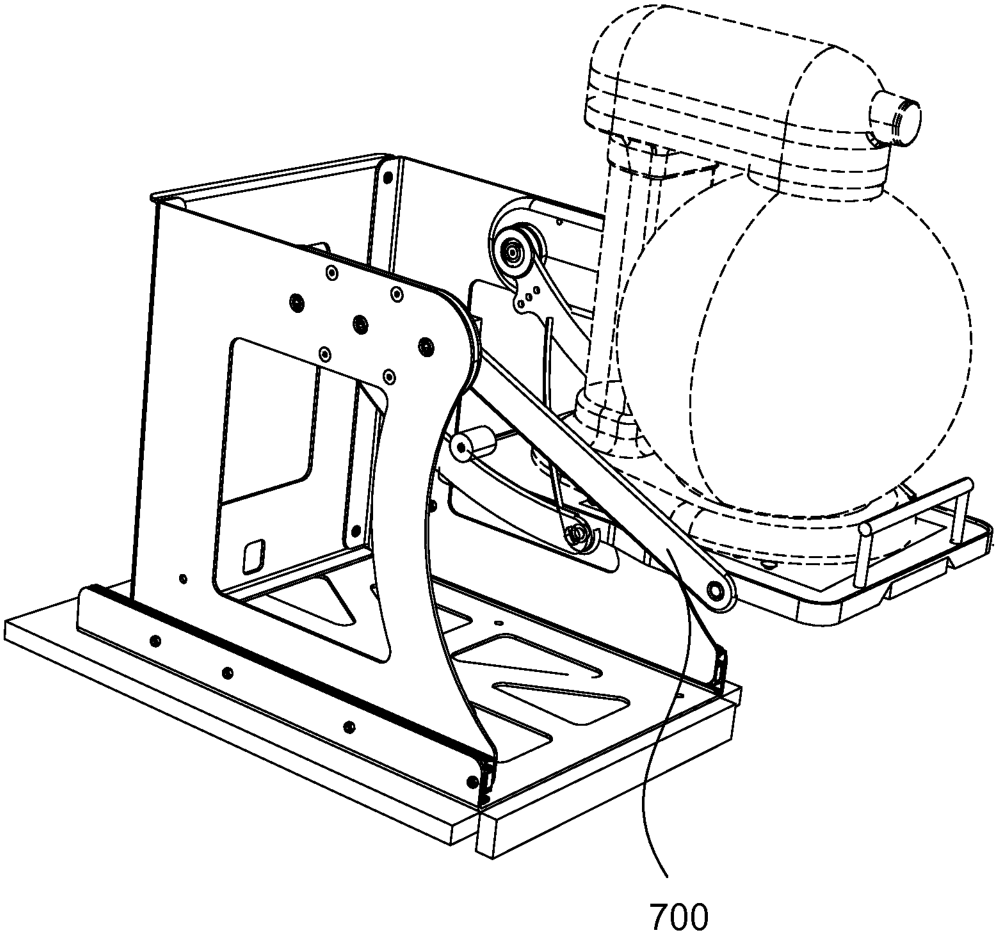
FIG. 42 is a perspective view of an appliance lift partially lifted with a representative appliance, according to an embodiment of the technology described herein.
Figure 43:
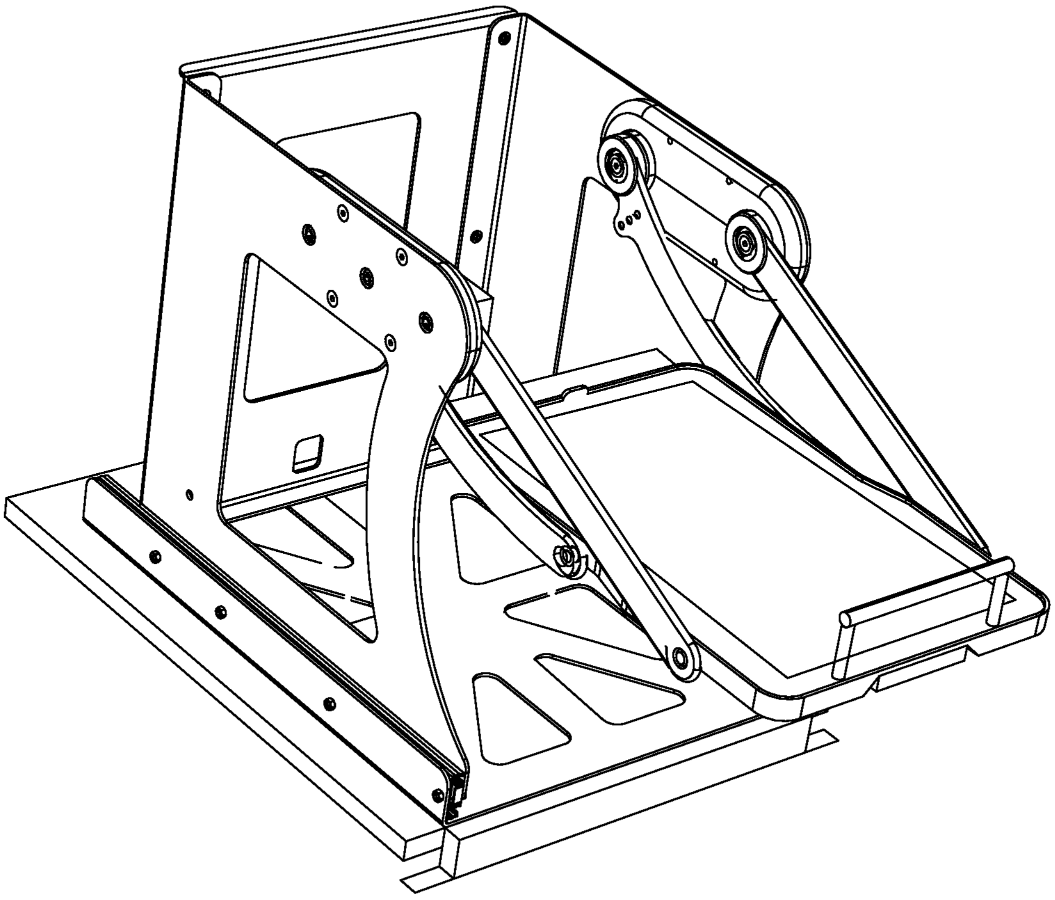
FIG. 43 is a perspective view of an appliance lift, partially lifted with no representative appliance, according to an embodiment of the technology described herein.
Figure 44:
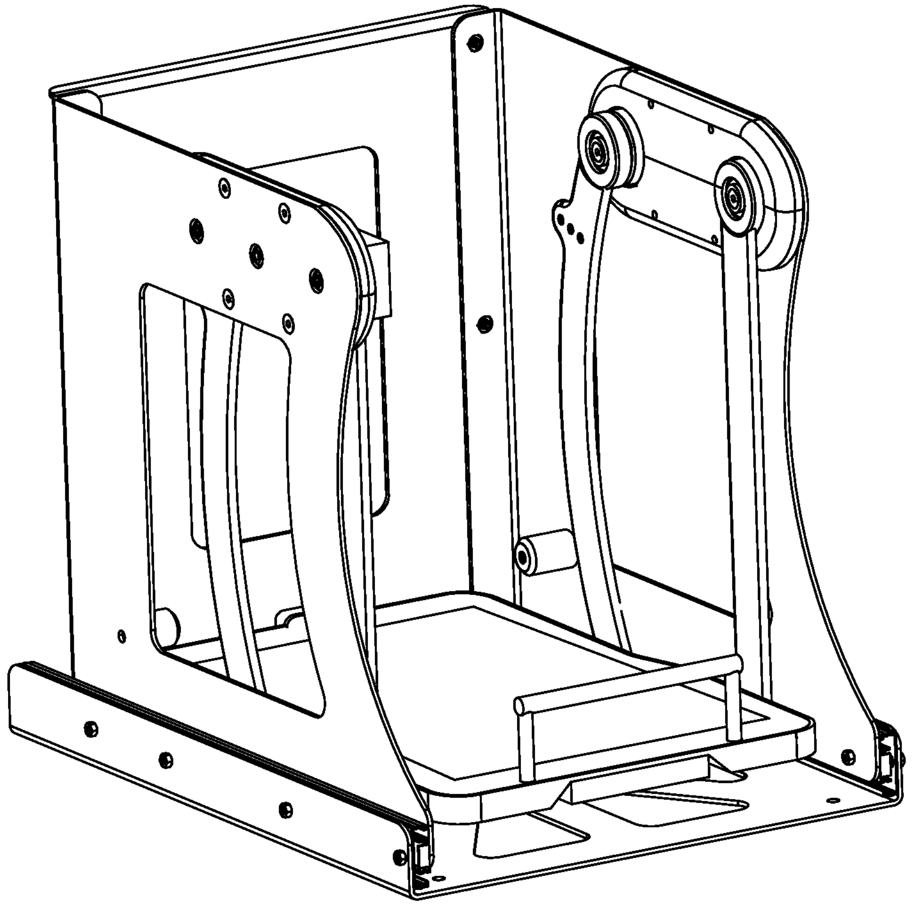
FIG. 44 is a perspective view of an appliance lift, according to an embodiment of the technology described herein.
Figure 45:
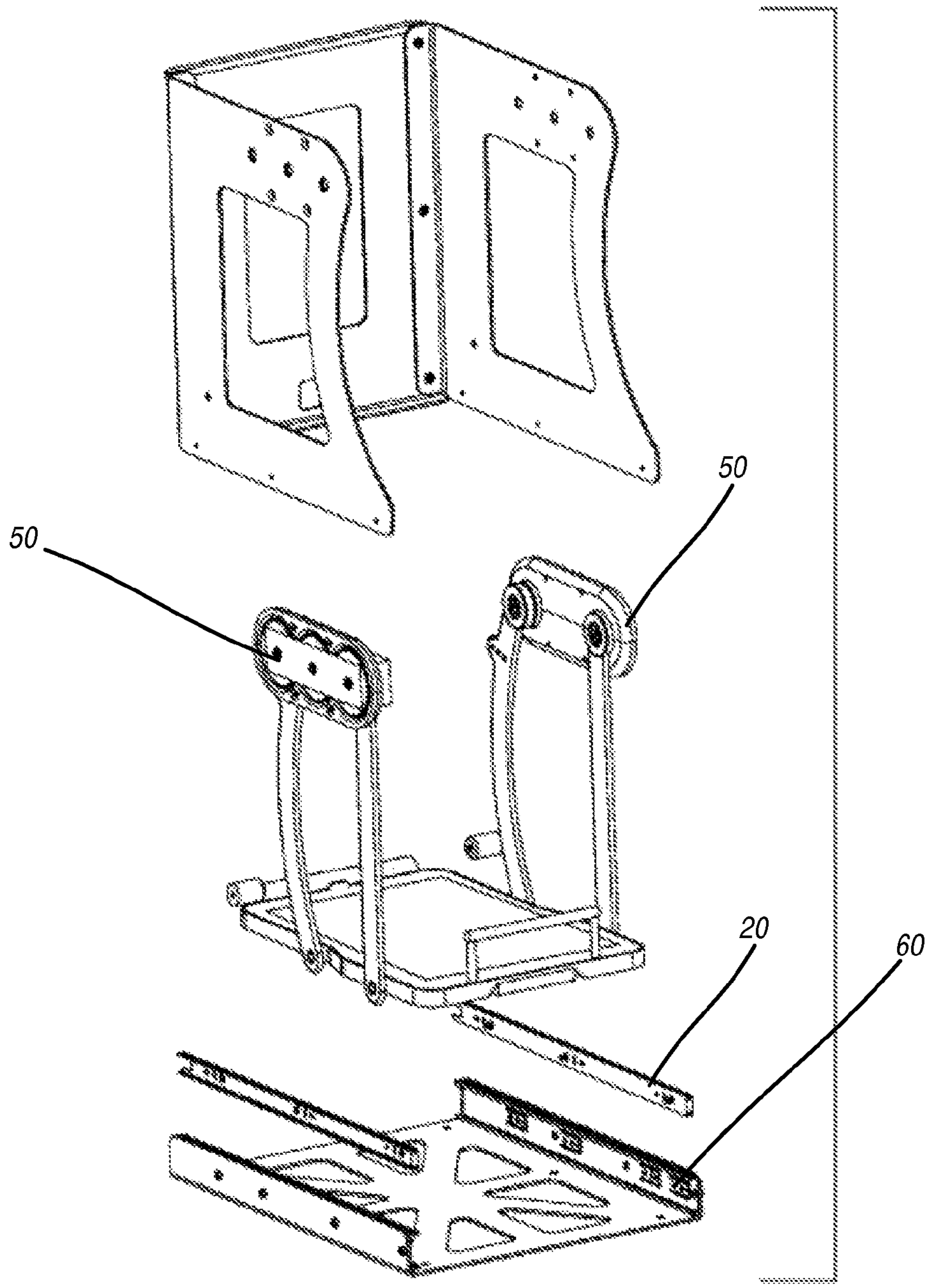
FIG. 45 is an exploded view of an appliance lift, according to an embodiment of the technology described herein.
Figure 46:
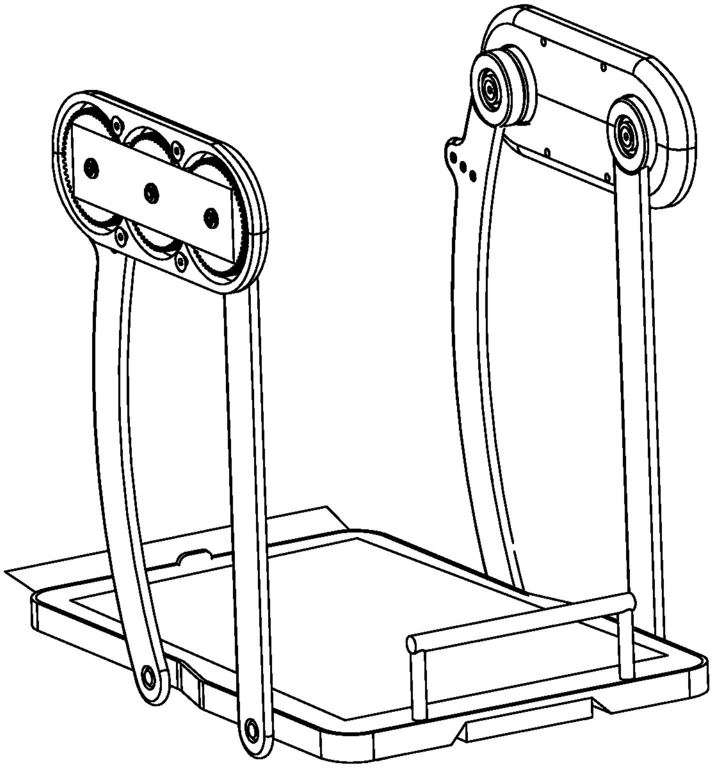
FIG. 46 is a perspective view of a subassembly of an appliance lift, according to an embodiment of the technology described herein.
Figure 47:
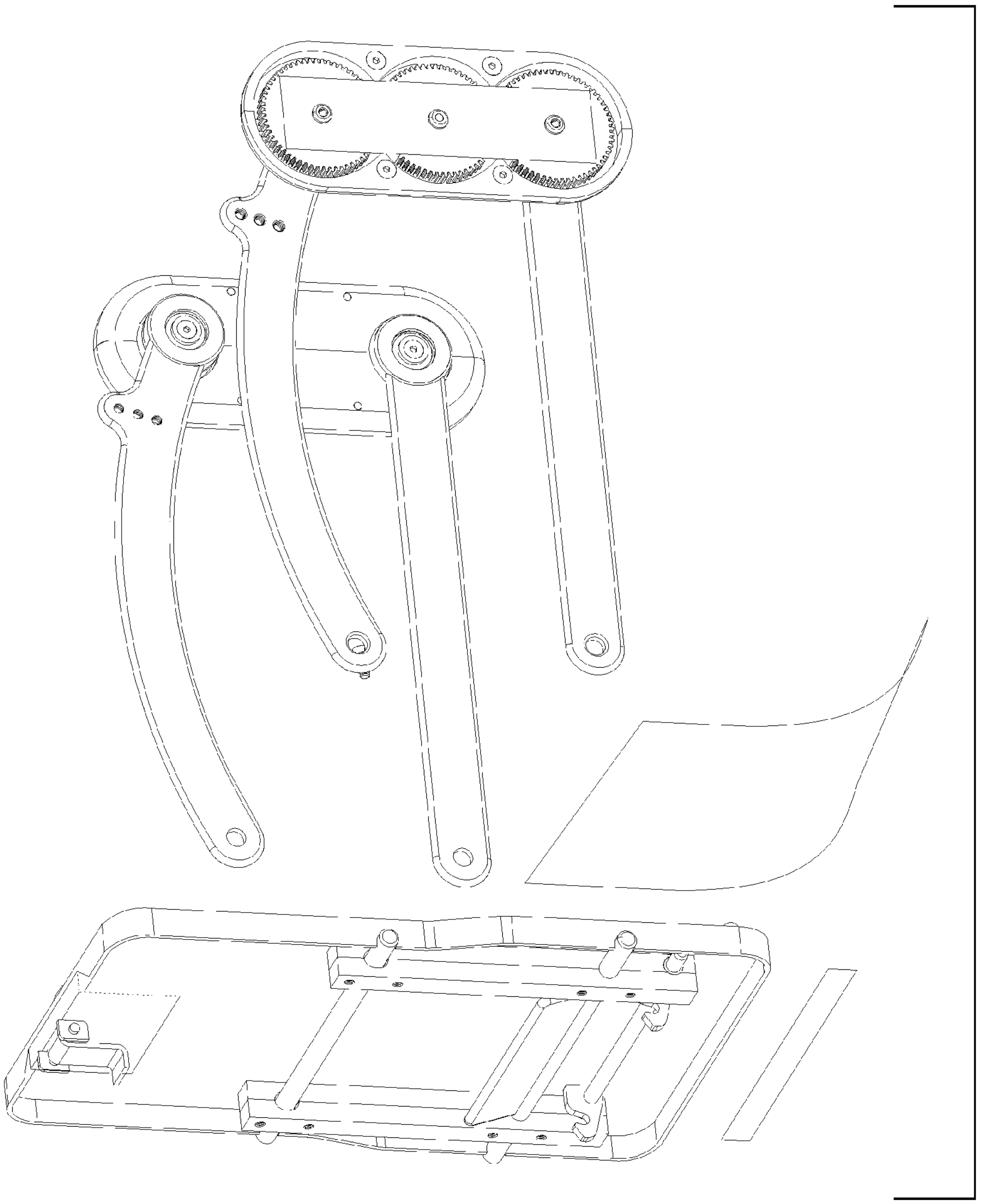
FIG. 47 is an exploded view of a subassembly of an appliance lift, according to an embodiment of the technology described herein.
Figure 48:
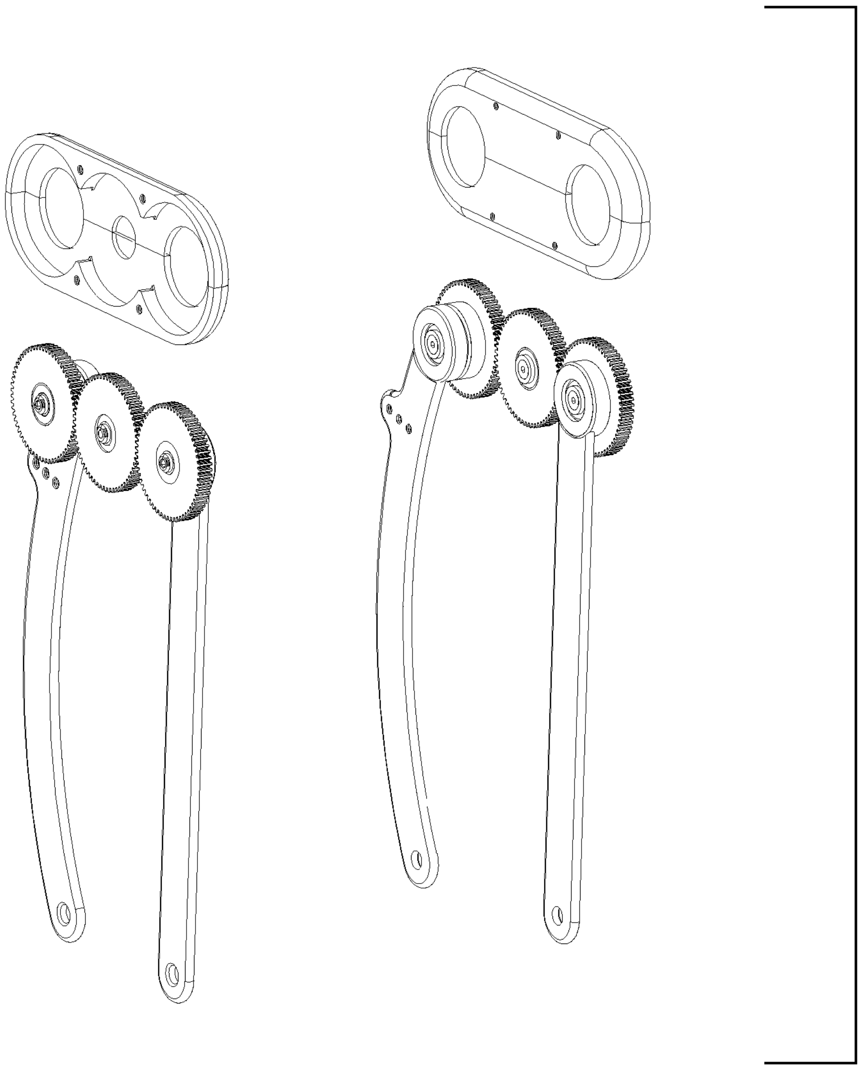
FIG. 48 is an exploded view of a sub-subassembly of an appliance lift, according to an embodiment of the technology described herein.

FIG. 38 illustrated the final floor bracket adjustment—Screwing Brackets into Place.

Step 4: Place Wood Frame in Cabinet and Secure Upper Bracket to Frame: Place the wood frame inside the cabinet. Be sure there is sufficient space on both sides of the wood frame in order to screw in the upper bracket. Position the frame as far forward in the cabinet as possible. (Be aware that the unit will not be put inside the cabinet) See FIG. 39.

Use #6×0.5" screws (3 on each side) to secure top bracket to the “wood side panels” of the wood frame. Position the bracket high enough so that it cannot be seen by the customer from normal viewing height.

Step 5: Screw Down Floor Bracket: Move the wood frame to the correct position horizontally. Depending on the location of the door hinge, you may want to move the wood frame all the way to the right or left inside the cabinet. In addition move the wood frame forward so that the unit is as far forward as possible. The user should close the door to make sure that it will still shut. Once in position, Screw in the 4 floor brackets to secure the unit down to the floor of the cabinet. Use two screws per bracket to secure the unit to the floor of the cabinet. Additional brackets and screws can be added for extra support.

Step 6: Secure Upper Bracket to Cabinet Frame Under Drawer: The next step is to screw in the upper bracket to the back of the cabinet frame, just under the drawer. It may be easier to remove the drawer in order to do this. Use 3 screws of appropriate length to fasten the upper bracket to the horizontal stile of the cabinet frame. This step may require the installer to enter into the cabinet in order to reach the screws. The bit extender might also help to reach the screws as well.

Step 7: Attach Appliance Lift to Wood Frame: The unit is shipped with straps to prevent it from rotating to the “up” position. Remove the straps from the unit being sure not to rotate the unit at all. Once the straps have been removed, pick up the unit and line up the rail cabinet member to the drawer member that is mounted on the lift unit itself. Push the unit about halfway until the rails lock into place. Be sure that the unit will stay on the rails and support the weight before removing your hands from the unit. Do not attempt to push it all the way into the cabinet until the rail stops have been moved to the forward position.

Step 8: Operation of Unit: To operate the unit, grab the “U handle” on the top of the mixer platform and pull the unit out of the cabinet until you feel a significant resistance from the rail stops. Then lift the mixer upwards while still holding the handle on the mixer platform. As the unit rotates upwards, keep your hand on the “U handle” or platform until it rests on the countertop.

If unit does not lock when pulling to the upright position, the position of the rail stops may need to be adjusted forward or back to achieve the desired result.

To move the unit back to its down position, press the “locking handle” located under the front of the mixer platform to “unlock” the unit. This will unlock the unit from the upright position. Then place your hand on the handle and swing the mixer down to its downward position. Slide the unit back into position inside the cabinet.

In an exemplary embodiment of the technology described herein an appliance lift 100 configured for installation within a cabinet and lifting an appliance 900 to countertop level is comprised on a metal frame assembly 200, an appliance platform assembly 300, and a lifting assembly 700. The platform assembly is further comprised of a U-handle 400 for ease of gripping, a rubber mat 600, and a release handle 500 for safety.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology described herein.

What is claimed is:

1. A method for installing and operating an appliance lift within a cabinet, the method comprising:

a. attaching at least one of a hardware to a pair of wood side panels;

b. assembling a wood frame;

c. positioning at least one of a floor bracket;

d. placing the wood frame in a cabinet;

e. securing an upper bracket to the wood frame;

f. screwing down the at least one of a floor bracket;

g. securing the upper bracket to a cabinet frame under a drawer;

h. providing an appliance lift assembly comprising:

an appliance platform assembly to provide a horizontally oriented, stable platform; and a lifting assembly configured to lift the appliance platform assembly, the lifting assembly consisting of a pair of lifting arms each having a proximate end and a distal end and having a fixed point at the proximate end about which each arm rotates, a pair of external gear subassemblies, each coupled to one of the lifting arms, and a pair of gas springs each operably coupled to the external gear subassemblies;

wherein the appliance lift assembly is configured to couple to a pair of glide-out rails disposed within the cabinet and oriented in a horizontal direction, thereby to direct the appliance lift assembly out of a front face of the cabinet and through a cabinet opening in a horizontal direction; and wherein the lifting assembly is configured to lift the horizontally oriented, stable appliance platform rotationally around the fixed point at the proximate end of each of the pair of lifting arms until a stop point at which a back face of the appliance platform abuts a front edge of a countertop of the cabinet; and i. attaching the appliance lift assembly to the wood frame.

2. The method of claim 1, further comprising installing an appliance on the appliance lift.

3. The method of claim 2, further comprising raising the appliance lift to counter level height.

4. The method of claim 3, further comprising lowering the appliance lift from counter level height.

5. An appliance lift assembly configured for installation within a cabinet and lifting an appliance to countertop level, the appliance lift assembly comprising:

a. a wood panel assembly;

b. a metal frame assembly;

c. an appliance platform assembly operably connected to the metal frame assembly, the appliance platform assembly to provide a horizontally oriented, stable platform; and d. a lifting assembly operably connected to the metal frame assembly and configured to lift the appliance platform assembly, the lifting assembly consisting of a pair of lifting arms each having a proximate end and a distal end and having a fixed point at the proximate end about which each arm rotates, a pair of external gear subassemblies, each coupled to one of the lifting arms, and a pair of gas springs each operably coupled to the external gear subassemblies;

wherein the appliance lift assembly is configured to couple to a pair of glide-out rails disposed within the cabinet and oriented in a horizontal direction, thereby to direct the appliance lift assembly out of a front face of the cabinet and through a cabinet opening in a horizontal direction;

wherein the lifting assembly is configured to lift the horizontally oriented, stable appliance platform rotationally around the fixed point at the proximate end of each of the pair of lifting arms until a stop point at which a back face of the appliance platform abuts a front edge of a countertop of the cabinet.

6. The appliance lift assembly of claim 5, the platform assembly further comprising a U-handle.

7. The appliance lift assembly of claim 6, the plat form assembly further comprising a rubber mat.

8. The appliance lift assembly of claim 7, the platform assembly further comprising a release handle.

9. The appliance lift assembly of claim 5, the wood panel assembly operably connected to a kitchen cabinet.

* * * * *